US008370732B2

(12) United States Patent
Black et al.

(10) Patent No.: US 8,370,732 B2
(45) Date of Patent: Feb. 5, 2013

(54) PEER-TO-PORTAL MEDIA BROADCASTING

(75) Inventors: Tyler James Black, Victoria (CA);
Dylan John Hansen, Victoria (CA);
Leonard Harley, Victoria (CA); Ronald Loren Kirkby, San Diego, CA (US);
Kevin Justin Slagboom, Victoria (CA);
Colby James Magee Smith, Victoria (CA); Ronald William Stevens, Vancouver (CA); James Ormond Loucks, Victoria (CA); Seamus Gregory Davis O'Connor, Victoria (CA); Brian Charles Oraas, Victoria (CA); Bryn Adam Aspestrand, White Rock (CA)

(73) Assignee: Mixpo Portfolio Broadcasting, Inc., Seattle, WA (US)

( * ) Notice: Subject to any disclaimer, the term of this patent is extended or adjusted under 35 U.S.C. 154(b) by 1256 days.

(21) Appl. No.: 11/712,643

(22) Filed: Feb. 28, 2007

(65) Prior Publication Data
US 2008/0098301 A1    Apr. 24, 2008

Related U.S. Application Data

(63) Continuation-in-part of application No. 11/584,405, filed on Oct. 20, 2006, now Pat. No. 7,827,298.

(51) Int. Cl.
*G06F 17/00* (2006.01)
(52) U.S. Cl. ........................ 715/205; 715/201
(58) Field of Classification Search .................. 715/205, 715/201
See application file for complete search history.

(56) References Cited

U.S. PATENT DOCUMENTS

| 7,085,994 | B2 * | 8/2006 | Gvily | 715/234 |
|---|---|---|---|---|
| 7,356,600 | B2 * | 4/2008 | Offermann | 709/229 |
| 7,512,651 | B2 * | 3/2009 | Offermann | 709/203 |
| 7,668,963 | B1 * | 2/2010 | Miner et al. | 709/231 |
| 7,865,494 | B2 * | 1/2011 | Best et al. | 707/707 |
| 7,930,631 | B2 * | 4/2011 | Sahota et al. | 715/239 |
| 8,073,903 | B2 * | 12/2011 | Wood et al. | 709/203 |
| 2001/0056460 | A1 * | 12/2001 | Sahota et al. | 709/201 |
| 2003/0041109 | A1 * | 2/2003 | Meloni et al. | 709/205 |
| 2005/0007965 | A1 * | 1/2005 | Hagen et al. | 370/260 |
| 2005/0138560 | A1 * | 6/2005 | Lee et al. | 715/719 |
| 2006/0156219 | A1 * | 7/2006 | Haot et al. | 715/500.1 |
| 2007/0203911 | A1 * | 8/2007 | Chiu | 707/10 |

OTHER PUBLICATIONS

Nejdi et al., Super-Peer-Based Routing and Clustering Strategies for RDF-Based Peer-TO-Peer Networks, 2003, ACM, pp. 536-543.*

* cited by examiner

*Primary Examiner* — Doug Hutton, Jr.
*Assistant Examiner* — Soumya Dasgupta
(74) *Attorney, Agent, or Firm* — Soquel Group LLC

(57) ABSTRACT

A system for peer-to-portal broadcasting, including a portal web server serving a portal web page that includes source code received from and generated by a broadcast server, to a web browser, in response to a request received from the web browser, a broadcast server, including a source code generator for generating the source code that is included in the portal web page, in response to a request received from the portal web server, a web client computer for requesting the portal web page from the portal web server and for executing the source code included in the portal web page, and a publisher computer that enables a publisher to broadcast media files from the publisher computer to the web client computer via the broadcast server, in response to the web client computer executing the source code included in the portal web page.

14 Claims, 14 Drawing Sheets

PEER-TO-PORTAL MEDIA BROADCASTING

CROSS REFERENCES TO RELATED APPLICATIONS

The present application is a continuation-in-part of assignee's pending application U.S. Ser. No. 11/584,405, now U.S. Pat. No. 7,827,298, filed on Oct. 20, 2006, entitled "Peer-to-Web Broadcasting", which is hereby incorporated by reference in its entirety.

FIELD OF THE INVENTION

The subject invention relates to multimedia broadcasting over the Internet.

BACKGROUND OF THE INVENTION

Traditionally, two architectures have been introduced to enable publishing or broadcasting video content, referred to as "video clips", over the worldwide web; namely, a server-based architecture and a peer-to-peer architecture.

The server-based architecture requires that a creator of a video clip, referred to as a "content owner", upload his video clip to an Internet server. The Internet server maintains a directory of content and allows users to view the content and download or stream the content. The disadvantages of this approach are: (1) it is time-consuming to upload large video files; and (2) the content owner must maintain his content on his own computer system and also on the Internet server, which is cumbersome. To speed up the upload process, the content owner generally reduces the size and quality of the video clips that are broadcast. Video normally seen in full-screen size when played locally from the owner's hard drive, becomes confined to small windows, one-fifth the size of the original, when streamed from a remote server over the Internet.

The peer-to-peer (P2P) computing architecture, which relies less upon dedicated servers, provides an alternative approach. Peer-to-peer computing involves sharing of computer resources and services through direct communication between peer computer systems. Conventional P2P computing enables peer computers to exchange files and to communicate directly between one another. As such, a peer computer may act as a client device or a server device, depending on the computing process and the needs of the network of peer computers.

The peer-to-peer architecture was initially introduced to enable interactive, person-to-person communication on the Internet. Early Internet Relay Chat (IRC) systems enabled people all over the world to participate in real-time text-based conversations. Using an IRC client, a user can exchange text messages interactively with other users. When logged into a chat session, a user "converses" by typing messages that are instantly sent to other chat participants. In recent years, instant messaging (IM) systems, such as AOL's Instant Messenger, Microsoft's MSN Instant Messenger and Yahoo!'s Pager have added the capability to transmit files, including video, sound and image rich media files, between peer computers. However, transmitting rich media files using IRC or IM systems has the disadvantage that the entire media file must be transmitted, which is cumbersome for the content owner, and the disadvantage that the content owner loses control over his media.

Some recent popular forms of P2P computing include the file-sharing services provided by Napster, Gnutella, Freenet and Groove. These file-sharing services allow peer computers to identify and share data files with other peer computers over the Internet. Napster, for example, utilizes a centralized directory service that is provided on one or more dedicated server computers connected to the Internet. To search for and discover a file, such as an MP3 song, to download from another peer computer, a Napster client queries the dedicated server computers and central directory therein, which responds with a list of other Napster configured peer computers that have the requested file. The requesting Napster client then connects directly with one of the identified other peer computers, to access and download the requested file. The other peer computer acts as a server to support the downloading process. A disadvantage of this approach is that the Napster server may not have up-to-date information about the Napster clients, and thus some content may be unavailable or out-of-date. Another disadvantage is that the central directory may indicate that certain content is available from a peer, but that peer may not be online and so a requesting peer would not be able to make a connection.

Unlike Napster, Gnutella does not rely on a centralized directory service, and thus does not require dedicated server devices. Instead, files are discovered by having peer computers directly communicate, and pass queries from peer computers to other neighboring peer computers. Upon receiving a query, a Gnutella peer computer may, for example, decide to do nothing, respond back to the requesting peer computer, such as by notifying the requester that the requested file has been found, or forward the query on to one or more other peer computers, thus widening the search for a given file. If the requested file is available for access and downloading from at least one of the other peer computers, then the requesting Gnutella peer computer, acting as a client device, connects to that peer computer and begins accessing and downloading the requested file. Here, again, the other peer computer acts as a server during the accessing or downloading process.

A general disadvantage of peer-to-peer file sharing is that if a client receives several requests simultaneously, then these requests compete for the relatively limited resources of bandwidth and disk access. Therefore, either the system degrades with each additional simultaneous requester, or the receiving client must refuse service to additional requestors. By contrast, with server-based approaches the provider of the service can add additional servers and load balance among them, and they can store multiple copies and cache often-requested media.

Disadvantageously, most P2P file-sharing services require a user to download an entire file. Although the downloading of a file gives a user certain advantages, the transfer of the file and subsequent viewing and/or listening can be undesirable from the perspective of a content owner. The relative ease with which a copy of a file can be obtained can lead to copyright violation. Further, the transfer of files can be in non-real time, which permits a user to transfer a substantial quantity of data from other users in a short period of time. This can undesirably occupy a large amount of network bandwidth for both the user who is copying the files and the users who are providing the files.

Music and video streaming was introduced to eliminate the disadvantages associated with downloading or uploading rich media files. Streaming enables a user to view a video clip as it is being received on their computer, without having to wait for the video file to be received in its entirety before playback can begin, and without saving a copy of the video file.

Thus, it would be of advantage to have a service that streams music and video, does not require that a content owner upload his media files to a server, provides up-to-date information about available media clips, caches often-requested media files on a server computer, and does not require special media playing software to view streamed videos, music and images.

SUMMARY OF THE DESCRIPTION

The subject invention concerns a third architecture for video broadcasting; namely, a peer-to-web broadcasting architecture. Using the subject invention, a user of a client peer computer can broadcast his media from his computer over the web. The user's media can be viewed within conventional web browsers that use conventional media players, such as a Windows Media Player or a Macromedia Flash player control. Such media players are generally available on most platforms and web browsers. As such, the subject invention does not require additional viewing software. The broadcaster, also referred to as a publisher, can organize his media into multiple broadcast channels, which viewers can then select from for viewing.

The subject invention overcomes drawbacks of conventional video broadcasting technology that uses a central server. Using the subject invention, an owner of video clips has complete control over the broadcast of his clips, and the people who have viewing privileges. No upload to a central hosting server is required. No coordination of instructions with a hosting server is required. No time is wasted uploading videos to a central server. The subject invention does not copy source files or upload source files to a central server. Media is prepared on a local client computer for web delivery, and original video clips are protected against copyright piracy.

The subject invention is particularly advantageous for independent filmmakers, artists and musicians, who can use peer-to-web broadcasting to show their media to potential employers, licensees and other such business leads. Broadcasters can set their broadcast channels as public, in which case they can be searched and found by the general public. Alternatively, broadcasters can set their broadcast channels as unlisted, in which case they can be viewed by invitation only.

The subject invention is also particularly advantageous for consumers who wish to share their personal recorded video clips with friends and family. The invention enables them to establish private channels.

The subject invention also enables peer-to-portal broadcasting, where publishers can broadcast their media to a third-party portal, for viewing by a general portal audience. The broadcast media appears to the audience as if it is being sourced from the portal's web server, whereas in fact it is being sourced from the publishers' peer computers.

There is thus provided in accordance with an embodiment of the subject invention a method for peer-to-portal broadcasting, including providing a web page for a portal, the web page including an inline frame (iFrame), receiving meta-data for media files selected by a user for broadcast to the portal, and dynamically generating source code for the iFrame upon request, the source code including instructions for a web browser (i) to request an XML document that includes meta-data for user-selected media files, (ii) to transform the XML document to an HTML document using an XSLT transformation, and (iii) to insert the resulting HTML document into the web page for the portal.

There is further provided in accordance with an embodiment of the subject invention a system a system for peer-to-portal broadcasting, including a portal web server for a web portal, the portal web server storing a web page for a portal, the portal web page including an inline frame (iFrame) with a source originating at a broadcast server, a publisher computer, communicatively coupled with the portal web server, including a broadcast tool that enables a publisher to broadcast media files from the publisher computer to the web portal, a broadcast server, communicatively coupled with the portal web server and with the publisher computer, including an iFrame source generator for generating source code for the iFrame included in the portal web page, the source code instructing a web browser to transform at least one XML data-container document for broadcast media files, into at least one HTML page that assembles a plurality of web objects, and an XML document generator for generating XML data-container documents for broadcast media files, and a web client computer, communicatively coupled with the portal web server, including a web browser including a dynamic web page generator and assembler, for executing the iFrame source code generated by the broadcast server.

There is yet further provided in accordance with an embodiment of the subject invention a computer-readable storage medium storing program code for causing a computing device to provide a web page for a portal, the web page including an inline frame (iFrame), to receive meta-data for media files selected by a user for broadcast to the portal, and to dynamically generate source code for the iFrame upon request, the source code including function calls (i) to request an XML document that includes meta-data for user-selected media files, (ii) to transform the XML document to an HTML document using an XSLT transformation, and (iii) to insert the resulting HTML document into the web page for the portal.

There is moreover provided in accordance with an embodiment of the subject invention a broadcaster for publishing media content, including a video transcoder for transcoding video content from a source format to a target format at at least one target bit-rate, an image processor, communicatively coupled with the video transcoder, for generating at least one thumbnail image representation of the video content, a database manager, for managing a table of broadcast channels, a table of media files within channels, and a table of cached media files, a command sequencer, communicatively coupled with the video transcoder, the image processor and the database manager, for queuing and sequencing commands issued to the video transcoder, the image processor and the database manager, and a network engine for sending the video content to a proxy server, for streamed delivery to at least one web client on-demand.

BRIEF DESCRIPTION OF THE DRAWINGS

The subject invention will be more fully understood and appreciated from the following detailed description, taken in conjunction with the drawings in which.

DETAILED DESCRIPTION

The subject invention concerns peer-to-web broadcasting. Using the subject invention, a publisher can broadcast his media to the web from his peer computer, without uploading the media to a central server. As such the publisher retains complete control over his media assets, and who is able to view them.

Figure 1:
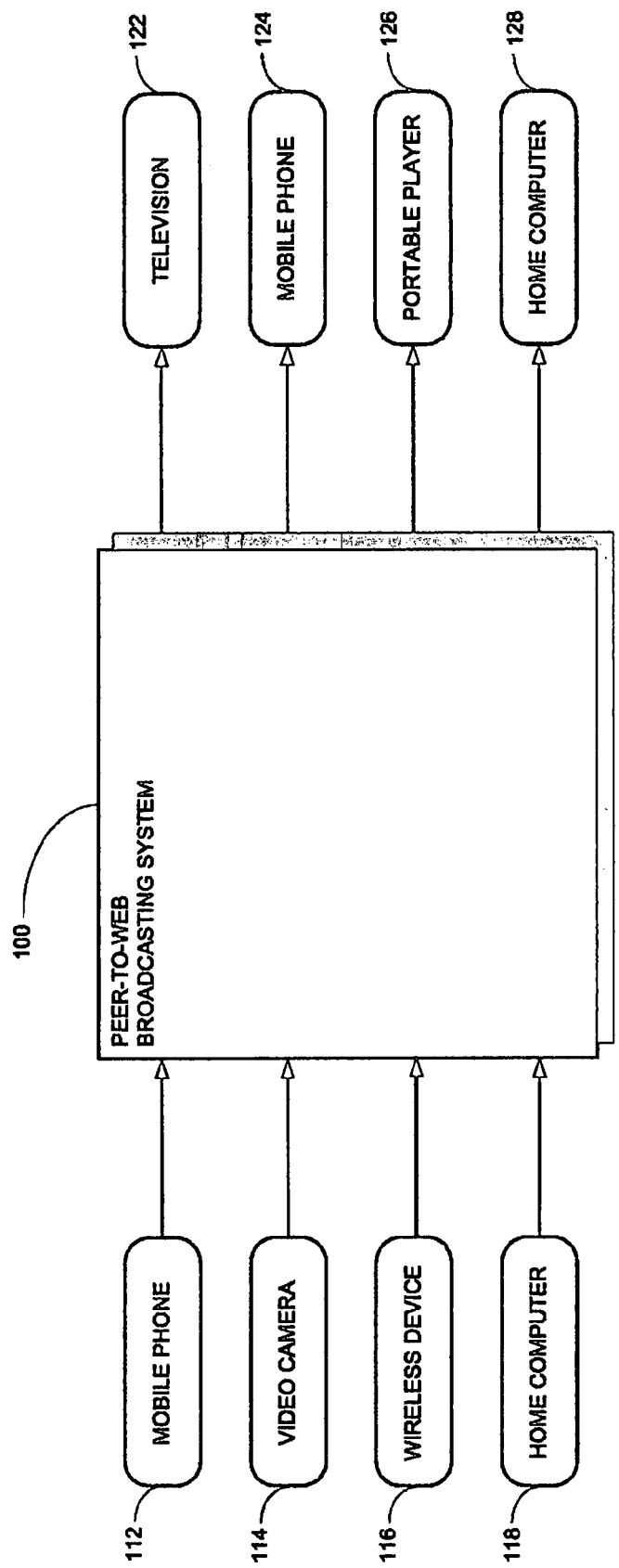
FIG. 1 is a simplified block diagram of a peer-to-broadcast system, in accordance with an embodiment of the subject invention.

Reference is now made to FIG. 1, which is a simplified block diagram of a peer-to-broadcast system, in accordance with an embodiment of the subject invention. Shown in FIG. 1 is a broadcasting system 100 that enables peer computers, referred to as publishers, to broadcast their media over the web. The publishers stores their media, and web clients can view the broadcast media using conventional web browsers, without requiring additional client software. The broadcast media can be live video, pre-recorded video, music, pictures, presentations, slideshows and other forms of media.

Media can be published on a mobile phone 112, a video camera 114, a wireless device 116, a home computer 118 and other such computing devices. Published media can be viewed on a television 122, a mobile phone 124, a portable player 126, a home computer 128 and other such computing devices that run a web browser.

The present invention is readily implemented within the Asynchronous JavaScript and XML (AJAX) architecture, used for dynamic HTML generation.

Figure 2:
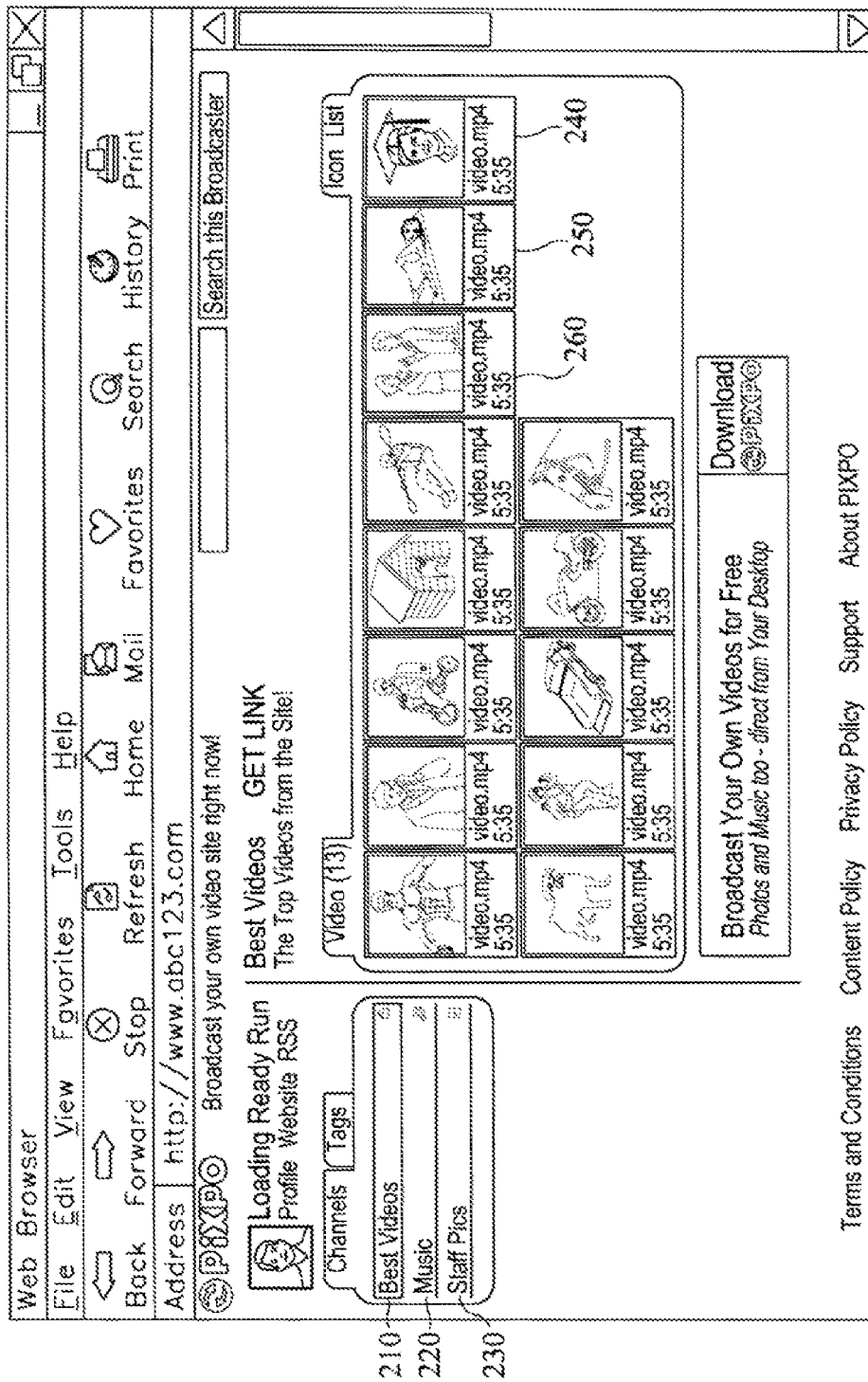
FIG. 2 shows a sample web page for viewing media on a web client computer, the media being broadcast from a peer computer in accordance with an embodiment of the subject invention.

Reference is now made to FIG. 2, which shows a sample web page 200 for viewing media on a web client computer, the media being broadcast from a peer computer in accordance with an embodiment of the subject invention. As can be seen in FIG. 2, web page 200 is displayed by a conventional web browser, such as Microsoft's Internet Explorer browser.

Shown in the upper left of web page 200 is a list of broadcast channels, each channel corresponding to a set of media related by a common theme that is generally the name of the channel. Channel 210 is named "Best Videos", and is currently the channel being displayed in web page 200. Channel 220 is named "Music" and channel 230 is named "Staff Pics". To the right of the list of channels is the set of media for the currently selected channel. Each piece of media is represented by a thumbnail, which is a small image that designates the media. Thus thumbnails 240, 250 and 260 correspond to videos from the "Best Videos" channel. By clicking on one of these thumbnails, a user can view the selected video within his web browser. The thumbnail images and the corresponding videos are generally stored on a peer computer of the publisher who created the channels.

Figure 3:
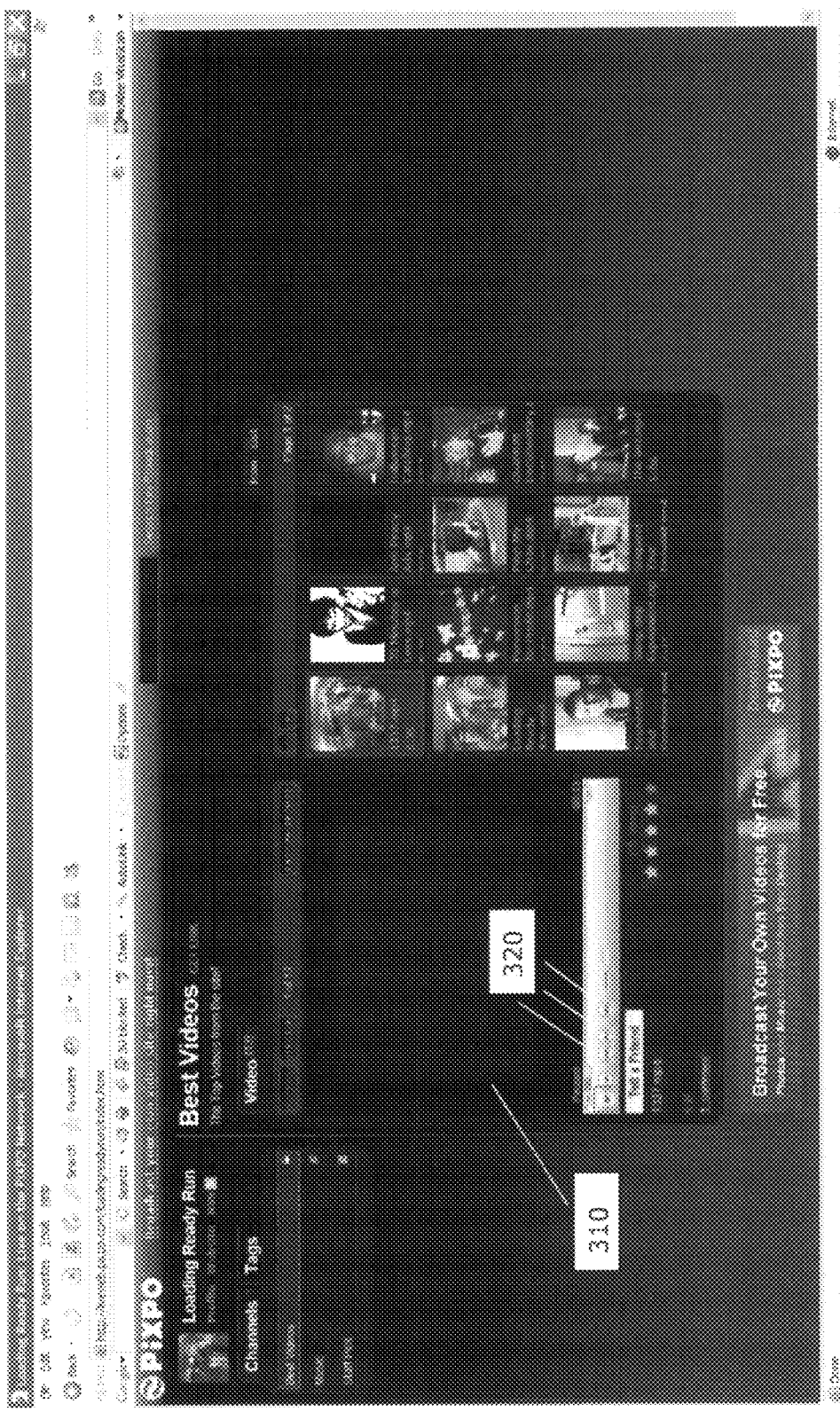
FIG. 3 shows a sample video viewing area overlaid on a sample web page, in accordance with an embodiment of the subject invention.

Reference is now made to FIG. 3, which shows a sample video viewing area overlaid on a sample web page 300, in accordance with an embodiment of the subject invention. When a user clicks on one of the video icons, such as icons 240, 250 or 260 of FIG. 2, the corresponding video is streamed to the user and played within a viewing area 310. Viewing area 310 includes typical video controls 320, for play/pause, stop, fast forward, fast reverse and volume control.

Generally, the web page for viewing published media is assembled from multiple sources, including inter alia:
  (i) hosted programmatic and layout elements (graphics, CSS, JavaScript, HTML);
  (ii) hosted content from broadcasting system 100 (FIG. 1);
  (iii) local multi-media content (video, image thumbnails);
  (iv) local data container elements (XML documents);
  (v) multi-media content (video, image thumbnails) from multiple remote publisher computers; and
  (vi) data container elements (XML documents) from multiple remote publisher computers.

Figure 4:
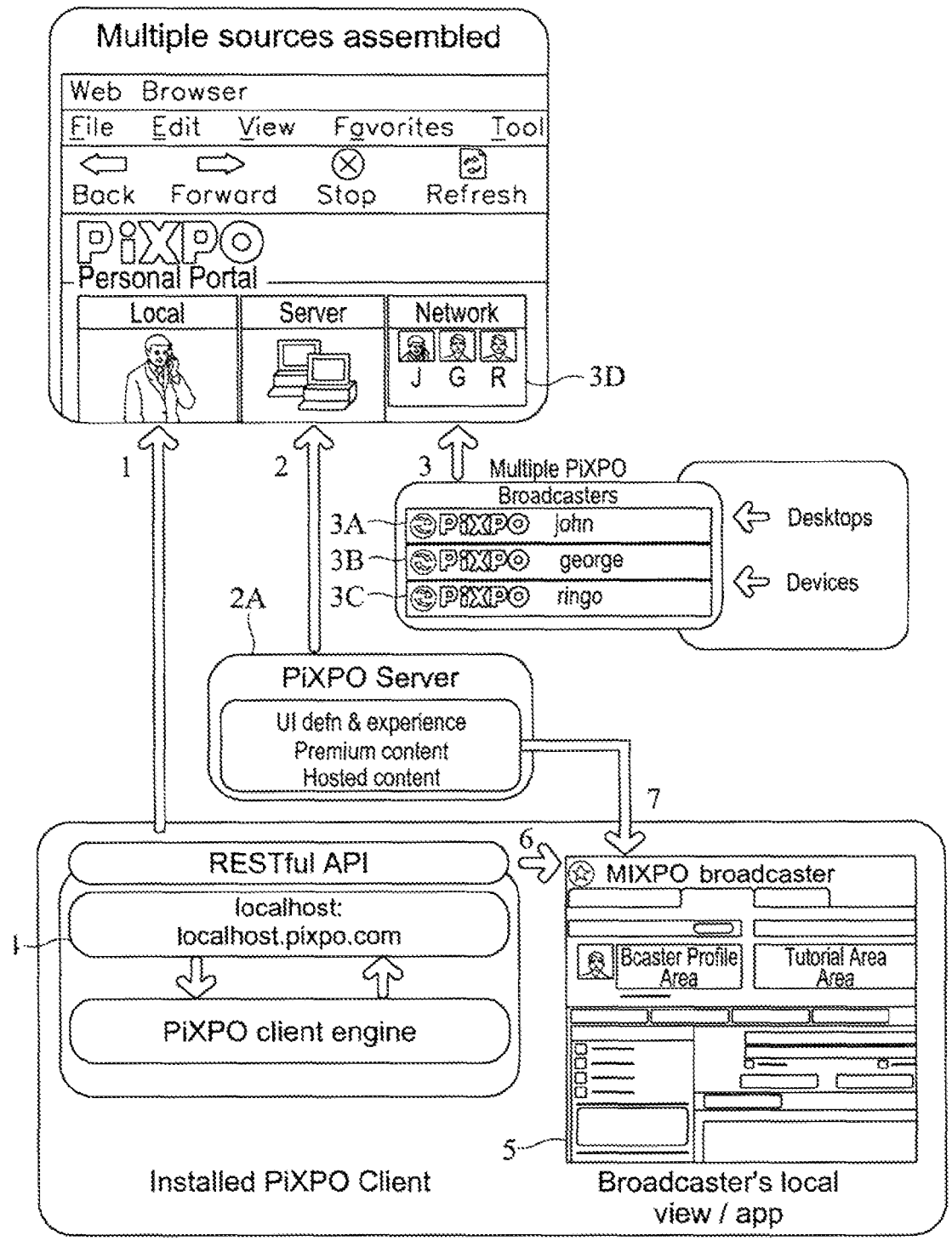
FIG. 4 is an illustration of a web page assembled from multiple sources, in accordance with an embodiment of the subject invention.

Reference is now made to FIG. 4, which is an illustration of a web page assembled from multiple sources (i)-(vi), in accordance with an embodiment of the subject invention. Shown at the top of FIG. 4 is a web page, denoted by A, rendered by a standard browser. Web page A includes components assembled from multiple sources.

A first source, denoted by 1, is local broadcast content. A local host server, denoted by 4, is treated as part of the domain for system 100 (FIG. 1), by including a DNS entry for "localhost.pixpo.com" which is mapped to 127.0.0.1, where "pixpo" is a web server name for system 100. It will be appreciated by those skilled in the art that effectively this DNS entry enables an Internet browser to treat the local host server as part of the domain for system 100. This is significant since web browser security policies generally require that dynamic content, such as iFrames and scripts, have a single domain of origin. The DNS entry thus enables web pages to be assembled from both local and remote endpoints without violating security policies enforced by the browser.

It will thus be appreciated by those skilled in the art that the subject invention bridges multiple domain hosts to a single domain, and facilitates communication between a local host and main page data through JavaScript. The subject invention enables access to information from any IP address via a sub-domain of an origin server. For example, if an HTML page is sent from www.mixpo.com, then that HTML page, via the subject invention's JavaScript bridge, can access any *.mixpo.com URL. Thus a DNS entry for "amazon.mixpo.com" can be mapped so that it resolves to Amazon's search API servers. JavaScript on a www.mixpo.com HTML page can then make remote data requests to Amazon's servers directly. Generally, such multiple calls to services from multiple domains are blocked by a browser's single origin security policy. Using the subject invention, however, a browser makes multiple connections to multiple services because of the JavaScript bridge, which maps an external domain, such as amazon.com, to an internal domain, such as amazon.mixpo.com. The browser then allows these connections, even though they connect to external domains.

In distinction, prior art technology, such as Google's "IG" pages, assembles multiple components into a page by assembling the page completely on central servers before sending it to a browser.

A second source, denoted by 2, is content from a broadcasting system 100. A third source, denoted by 3A, 3B and 3C, is content from multiple remote broadcasters John, George and Ringo desktop computers or other computing devices. The third source also includes data content 3D.

Shown at the bottom right of FIG. 4 is a web page, denoted by 5, for a broadcaster. Web page 5 also includes components assembled from multiple sources. A first source, denoted by 6, is local broadcast content. A second source, denoted by 7, is content from broadcasting system 100.

As shown in FIG. 4, source 1 for local content uses a Representational State Transfer (REST) application programming interface (API), for communicating with web page A and web page 5. Information about REST is available on the Internet at http://en.wikipedia.org/wiki/Representational_State_Transfer.

Figure 5:
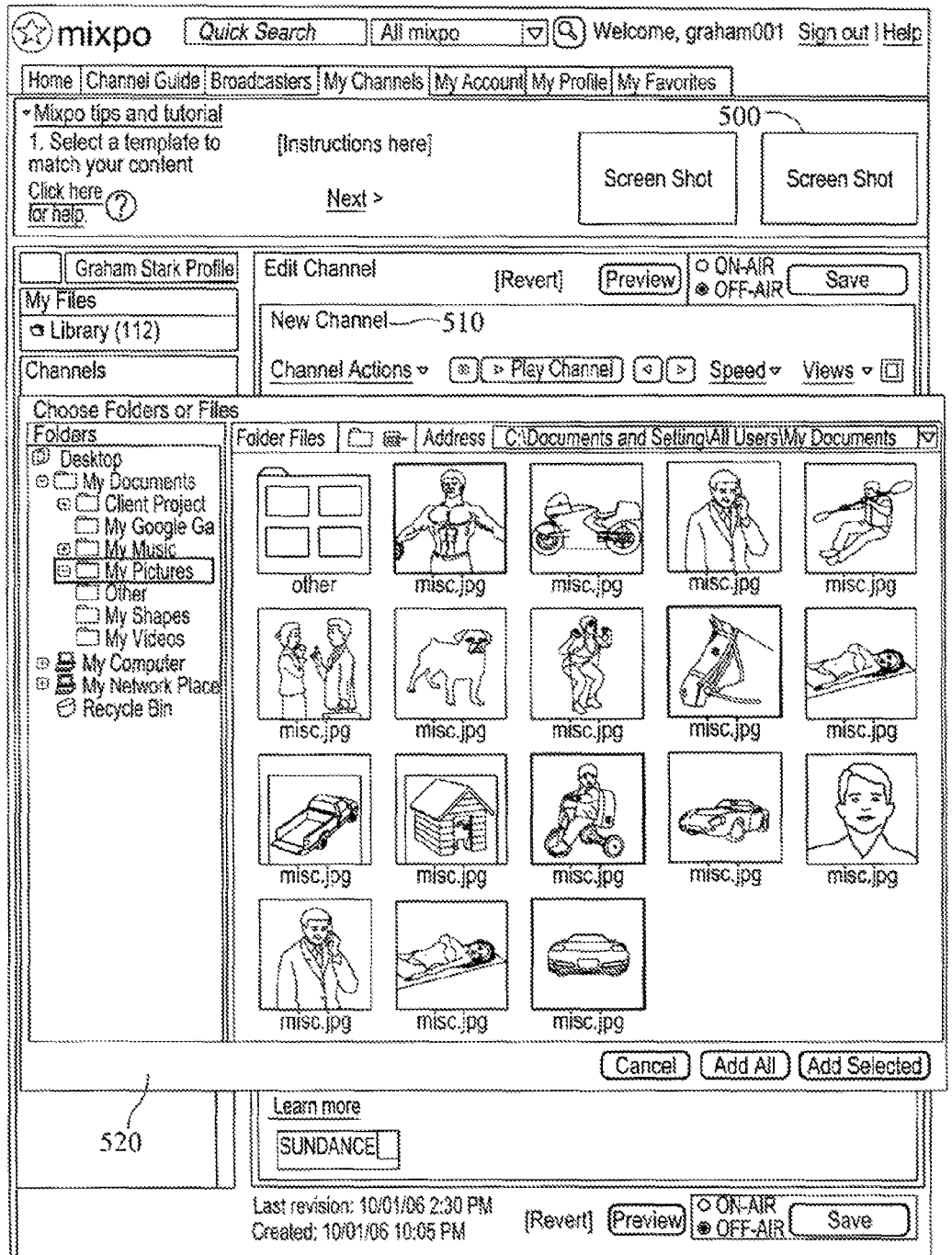
FIG. 5 shows a sample web page for publishing media on a peer computer, for web broadcast, in accordance with an embodiment of the subject invention.

Reference is now made to FIG. 5, which shows a sample web page 500 for publishing media on a peer computer, for web broadcast, in accordance with an embodiment of the subject invention. Web page 500 enables a publisher to create broadcast channels, such as the channels listed in FIG. 2, and to populate the channels with his media. As shown in FIG. 5, a publisher has created a new channel 510, temporarily named "New Channel", and an explorer-type window 520 enables the publisher to select media files from his file system to broadcast within the new channel. Channels can be designated as public, in which case they are made publicly available, or as unlisted, in which case they are only made available to friends that the publisher invites to see his media.

In accordance with an embodiment of the subject invention, information about publishers and their broadcast channels is stored in a central database, which can be queried by web clients in order to conduct searches for content.

Figure 6:
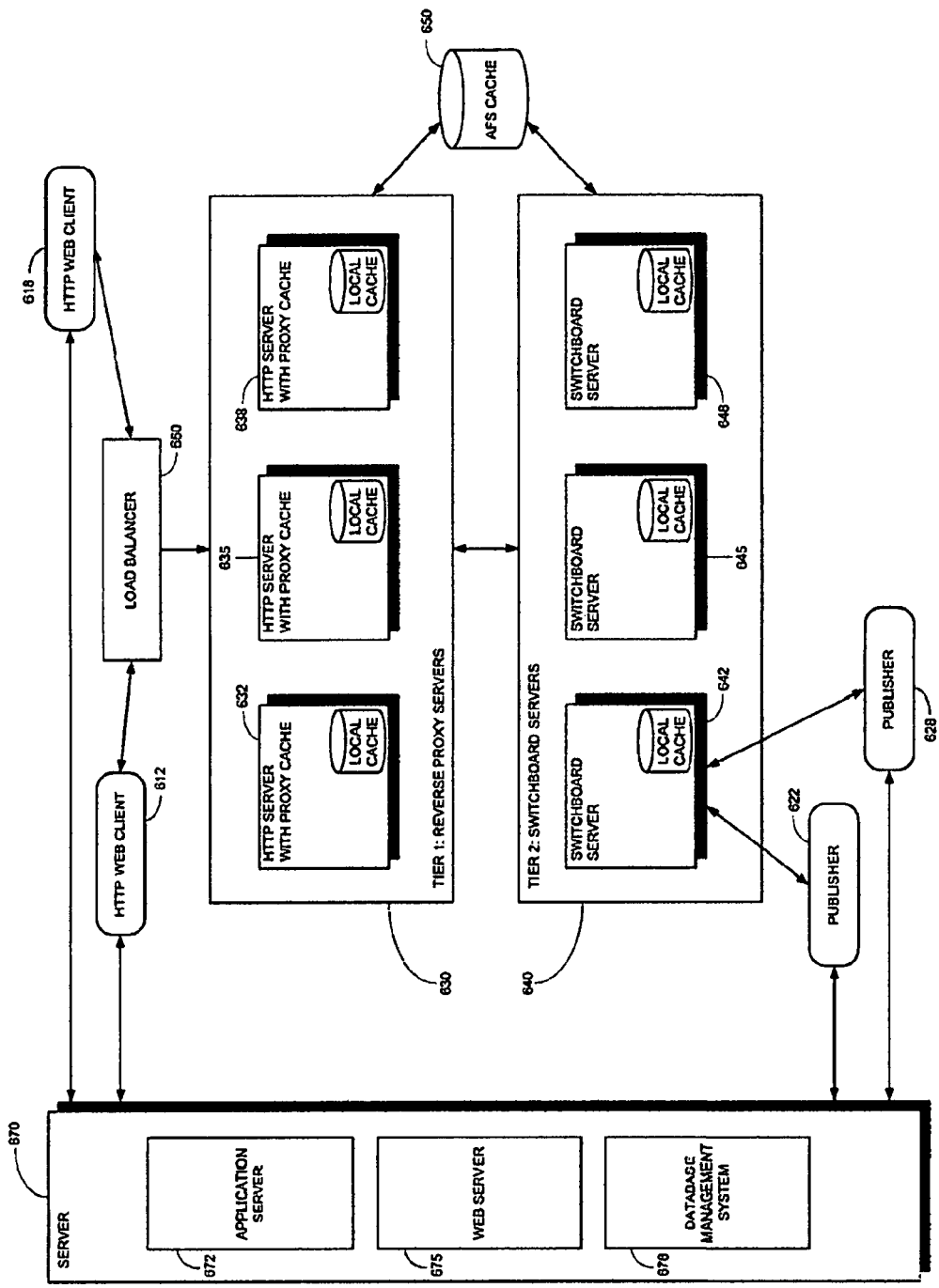
FIG. 6 is a simplified block diagram of a two-tier communication system for publishing media within the peer-to-broadcast system of FIG. 1, in accordance with an embodiment of the subject invention.

Reference is now made to FIG. 6, which is a simplified block diagram of a two-tier communication system for publishing media within the peer-to-broadcast system of FIG. 1, in accordance with an embodiment of the subject invention. As described hereinabove with respect to FIG. 1, the peer-to-broadcast system enables HTTP web clients 612 and 618 to view channels of media content broadcast by publishers 622 and 628.

The system shown in FIG. 6 includes two tiers of servers; namely, a first tier 630 of reverse proxy servers 632, 635 and 638, and a second tier 640 of switchboard servers 642, 645 and 648. Each server has its own local cache, and caches responses generally in accordance with the HTTP standard, which enable it to serve many clients while making only a small number of requests to another server.

When a publisher logs on to a switchboard server, the switchboard server writes a file to a master Andrew File System (AFS) directory. The file is named according to the username of the publisher, and the file contains the switchboard server's host name. Reverse proxy servers search the AFS directory for that file, to determine which switchboard server to contact for a designated publisher. It will be appreciated by those skilled in the art that the AFS directory is essentially being used here as a database. Because multiple switchboard servers are able to write to the same file, cooperative locking is used. It will further be appreciated by those skilled in the art that the subject invention may use an actual database, instead of a master AFS directory, for this purpose of maintaining a switchboard directory.

A distinction between the first tier servers and the second tier servers lies in the request to the next server. Specifically, the first tier reverse proxy servers extract a username from an HTTP request, and search the master directory for a file with that name. The file contains the name of a switchboard server. The second tier switchboard servers extract a username from an HTTP request, find a connected publisher with that username, and forward a request to the connected publisher. If a switchboard server receives a request for a publisher who is not connected, the switchboard server returns a 503 HTTP response code. JavaScript in the web client browser receives this response and handles it appropriately; e.g., redirecting to a "user not connected" page.

Each proxy server accepts regular HTTP connections on port 80, and forwards HTTP requests to an upstream server. The origin server is a publisher computer, which returns either data or an error code.

As shown in FIG. 6, each server has its own local cache. Cached items are indexed by URL, and each item has an expiration time and a cache validator. The cache validator is a last-modified date or an opaque identifier string, set by the origin server. If the URL is requested before it expires, its cached item is served right away from cache. Otherwise, if the URL has expired, a conditional request is made to the next server; i.e., to the switchboard server or to the origin server. The conditional request sends the cache validator to the next server. In turn, the next server uses the validator to determine whether the cached item for the URL is current. If the cached item is current, the next server returns an HTTP validation code, such as 304 Not Modified. Otherwise, if the cached data for the URL is not current, then the next server sends the updated data with an appropriate HTTP code, such as 200 OK.

In accordance with an embodiment of the subject invention, the servers aggregate requests. When a server receives three client requests for the same file, the file is fetched from the next server once, and served to all three clients. Aggregation occurs at each tier. Thus the reverse proxy servers aggregate many web clients, and the switchboard servers aggregate many reverse proxy servers. A proxy server does not invoke a second request for a specific URL while it is receiving a response for that URL. Instead, it adds a new client to the response being received. This mechanism protects publishers from receiving an excessive number of requests.

The servers are indifferent as to content type. All requests are processed through the aggregation and caching mechanisms, and all responses are treated as data streams. HTTP supports "keep-alive connections" and reuses connections for different web clients.

A load balancer 660 is used to distribute web client requests among servers 632, 635 and 638.

A system server 670 is used (i) to authenticate publishers, (ii) to manage the database of publishers, their broadcast channels, and their channel media content, and (iii) to serve up web content, such as HTML, XML and static graphic assets, to web clients and publishers, such as the web pages illustrated in FIG. 2-5 hereinabove. The video streams themselves are transmitted via the two tiers 630 and 640. Thus, referring to FIGS. 2 and 3, the content in web pages 200 and 300, and the broadcast channel information is transmitted from server 670 to web clients 612 and 618, and the video stream that is played in viewing area 310 is transmitted from the two tiers 630 and 640.

Server 670 includes an application server 672, a web server 675 and a database management system 678.

It will thus be appreciated by those skilled in the art that web page 300 synthesizes live content, static assets and hosted content in the same context. Specifically, content data, via XML documents, and media objects are transmitted to web clients 612 and 618, and in turn the web clients transform and assemble the content, based on template pages served by server 670. Transformations and page display are performed using XSLT, JavaScript and HTML code, as described hereinbelow in SOURCE CODE III-V. The subject invention's web page assembly technology enables displaying live content from multiple remote sources into a single web page. Multiple publisher content is assembled and presented in what appears to a user as a single coherent entity, whereas in fact it is a composite entity, built from multiple live broadcast sources.

It will also be appreciated by those skilled in the art that the architecture of FIG. 6 enables broadcast of multiple media streams from a single peer source; i.e., one-to-many broadcast from a single peer machine to multiple simultaneous viewers.

Details of operation of components of the system of FIG. 6 are described hereinbelow.

Reverse Proxy Servers 632, 635 and 638

Reverse proxy servers 632, 635 and 638 enable connections to publishers with dynamically assigned IP addresses. Specifically, these servers enable broadcasters to be connected to web clients using browsers that point to standard URLs. For example, if a publisher broadcasts from his home computer that has an internal IP address of 192.168.1.100 and a dynamically assigned IP address of 24.66.77.88, then HTTP servers enable the publisher to appear as http://liveweb.pixpo.com/john, and to serve content to a standard web client. The publisher does not have to run an HTTP server, and does not have to create a port for forwarding configurations for his NAT devices.

In accordance with an embodiment of the subject invention, reverse proxy servers 632, 635 and 638 operate as a cluster, with automatic dynamic failover in the event of a proxy failure. Reverse proxy servers 632, 635 and 638 run their proxies as a service. Proxy services have configurable options, including inter alia the options listed in TABLE I.

TABLE I

| Configurable options for HTTP servers | |
|---|---|
| Ports for the server to listen on | HTTP listen port<br>Reference to an AFS-hosted file which stores the switchboard server addresses |
| Log files | General (for general monitoring and debugging)<br>Access (Apache log file compatible)<br>Pid (for Linux service management) |
| Cache | Cache directory (path to a large volume)<br>Cache minimum expire time |

Switchboard Servers 642, 645 and 648

Firewalls and NAT routers are used in over 50% of home broadband users today. Nearly all firewalls and NAT routers block unsolicited inbound network traffic, which creates an obstacle for systems that involve peers on the Internet. One solution to overcoming this obstacle uses an intermediate Internet host to proxy network traffic. Firewalls and NAT routers generally block inbound traffic, but outbound traffic is allowed. Since TCP/IP is bi-directional, once a peer computer behind a firewall or NAT router establishes a connection to another host, that host can then send data back to the peer through the TCP/IP connection. Switchboard servers 642, 645 and 648 function as intermediate hosts.

Switchboard servers 642, 645 and 648 maintain connection tables with records of connections between HTTP web clients and publishers.

A load-balancing algorithm, based on least-loaded switchboard, is used to designate a switchboard server for each publisher. As such, generally any given publisher can connect to any switchboard server.

The architecture in FIG. 6 does not rely on a "thread-per-connection" approach for publishers 622 and 628. It has been found that a low commodity switchboard server can handle up to 20,000 simultaneous connections.

Switchboard servers 642, 645 and 648 run their switchboards as a service. Switchboard services have configurable options, including inter alia the options listed in TABLE II.

TABLE II

| Configurable options for switchboard servers | |
|---|---|
| Ports for the server to listen on | HTTP (HTTP servers should be configured to use this port)<br>Switchboard (logon server should direct publishers to use this port)<br>SOAPAdmin |
| Log files | General (for general monitoring and debugging)<br>Access (Apache log file compatible)<br>Pid (for Linux service management) |
| HTTP proxy | URLs for error page response lookups<br>Cache directory (path to a large volume)<br>Cache minimum expire time |

Cache 650

Use of cache within the subject invention provides many advantages, including improved quality of service for web clients, and decreased load on publisher computers. In accordance with an embodiment of the subject invention, cache 650 is a large Andrew File System (AFS) volume, which all servers have access to, although it may be appreciated by those skilled in the art that other cache volumes may be used instead. It has been found that a cache size of 200 GB suffices to hold several weeks' worth of data.

As shown in FIG. 6, each switchboard server and reverse proxy server features its own local cache. These caches reduce the amount of forwarded network requests necessary, and also support streaming incomplete portions of media files. In addition, the system includes the larger, global cache 650, which stores complete media files. Switchboard servers 642, 645 and 648 write to cache 650, and reverse proxy servers 632, 635 and 638 read from cache 650.

In accordance with an embodiment of the subject invention, when a switchboard server receives a complete media file, it copies the media file to cache 650, asynchronously from the HTTP request from the reverse proxy server. Cache 650 stores completely received media items from all switchboard servers. In general, dynamically generated items are not stored in cache 650. Whether a file is dynamic or static is determined by the HTTP compliant cache policy specified by the response from a publisher. Cache 650 stores complete media items, and generally is not used for streaming.

In accordance with an embodiment of the subject invention, cache 650 is a size-limited file system-based most recently used (MRU) cache. Each item of content in the cache has a "last used" timestamp. When a new data item is pulled from a publisher, it is added to the cache. When a requested item is found in the cache, the requested item is promoted to the top of the cache by resetting its "last used" timestamp to the current time.

Further in accordance with an embodiment of the subject invention, a cache utility program monitors the space occupied by contents of cache 650. The cache utility program accepts as parameters a path to a cache directory and a pre-specified size. If the space occupied by the cache contents exceeds the pre-specified size, the cache utility program deletes least recently accessed items until the occupied space is sufficiently reduced. The cache utility program may be scheduled to run on a timer, such as once every 30 minutes.

Figure 7:
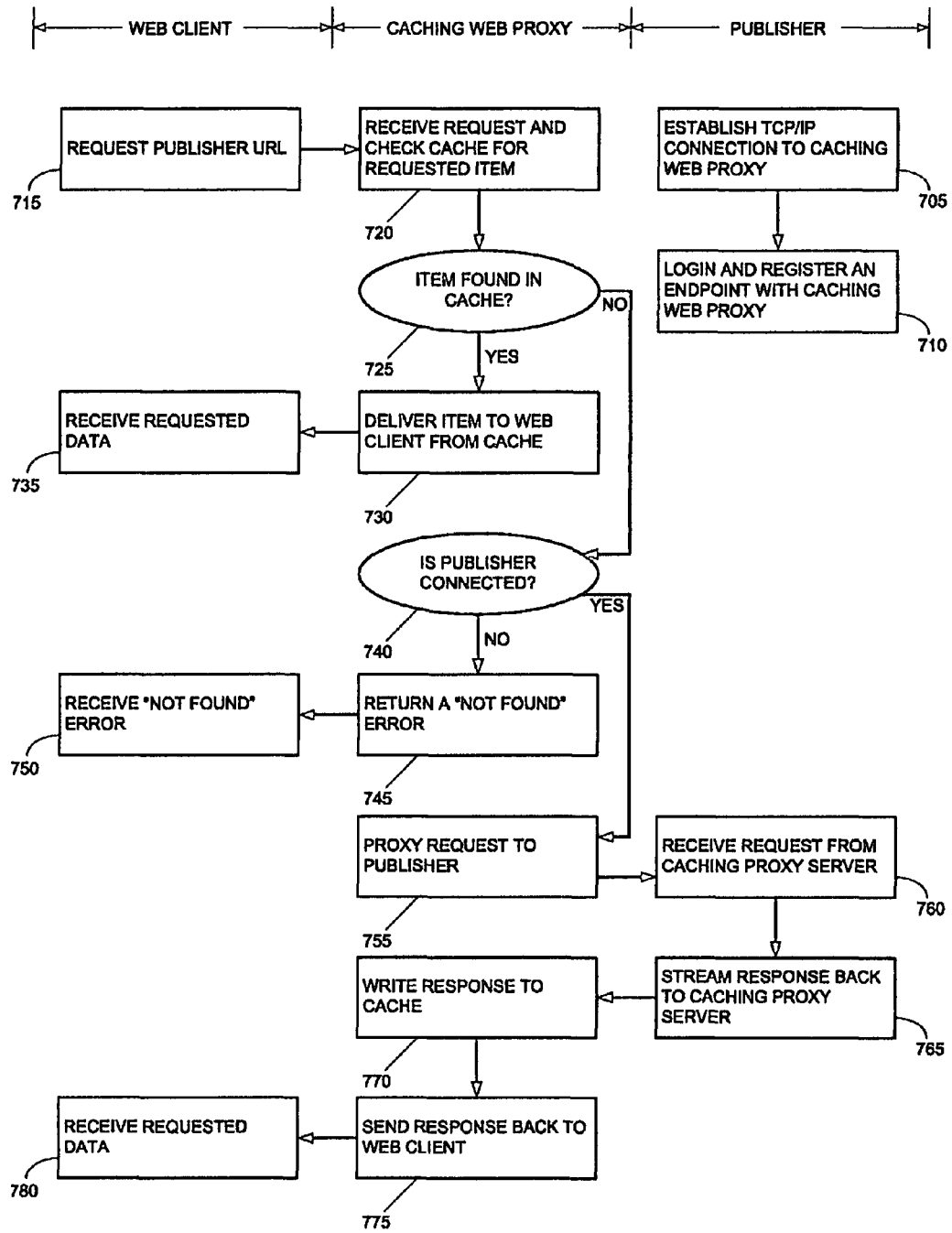
FIG. 7 is a simplified flow chart of a sequence of events within a peer-to-broadcast system, in accordance with an embodiment of the subject invention.

Reference is now made to FIG. 7, which is a simplified flow chart of a sequence of events within a peer-to-broadcast system, in accordance with an embodiment of the subject invention. The flowchart of FIG. 7 is divided into three columns. The leftmost column includes steps performed by a web client computer, such as web client 612 or 618 (FIG. 6), the middle column includes steps performed by a caching web proxy, such as HTTP server 632, 635 or 638, and the rightmost column includes steps performed by a publisher computer, such as publisher 622 or 628.

At step 705 the publisher requests to log on to an application server using HTTPS/XML messaging, and the publisher is directed to a switchboard proxy server, such as switchboard server 642, 645 and 648. At step 710 the publisher logs into the appropriate switchboard server and registers an endpoint, such as "/username/".

At step 715 a web client requests a publisher URL, such as http://live.pixpo.com/username/<media_file>. At step 720 the caching web proxy receives the request and checks its cache for the requested media item. If it is determined at step 725 that the media item is present in the cache, then at step 730 the item is delivered to the web client from the cache, and at step 735 the web client receives the data it requested. Otherwise, if it is determined at step 725 that the media item is not present in the cache, then a determination is made at step 740 whether or not the publisher is currently connected.

If the publisher is not connected, then at step 745 the caching web proxy returns a "not found" error, and at step 750 the web client receives the error message instead of the requested data. If the publisher is connected, then at step 755 the caching web proxy proxies the request to the publisher. At step 760 the publisher receives the request from the caching web proxy, and at step 765 the publisher streams a response back to the caching web proxy.

At step 770 the caching web proxy writes the response received from the publisher into its cache, and at step 775 the caching web proxy sends the response back to the web client. Finally, at step 780 the web client receives from the caching web proxy the data it requested.

In accordance with an embodiment of the subject invention, cached partially streamed files can be accessed from cache. I.e., a file does not have to be streamed to completion in cache and stored in its entirety as a file before it can be accessed from cache. If a viewer A starts watching a broadcast from publisher B, the proxy server begins streaming content to viewer A and caching it to file. If viewer C then starts watching the same content from publisher B, the proxy server detects this condition and begins streaming content to viewer C from the partially completed stream in the cache. It will be appreciated that this mechanism enables a "multi-cast" from a single source broadcast to a plurality of viewers.

Load Balancer 660

Referring back to FIG. 6, load balancer 660 forwards requests to HTTP servers 632, 635 and 638 based on a segmenting algorithm.

Server 670, Application Server 672, Web Server 675 and Database Management System 678

Server 670 is responsible for orchestrating the entire delivery of static and live content from publisher to web client. Application server 672 is responsible for authenticating publisher logins. Web server 675 is responsible for transmitting HTML pages to publishers 622 and 628 and to web clients 612 and 618. Database management system 678 is responsible for managing a database that stores publisher broadcast channels, channel meta-data, and the meta-data for individual files published within those channels.

Figure 8:
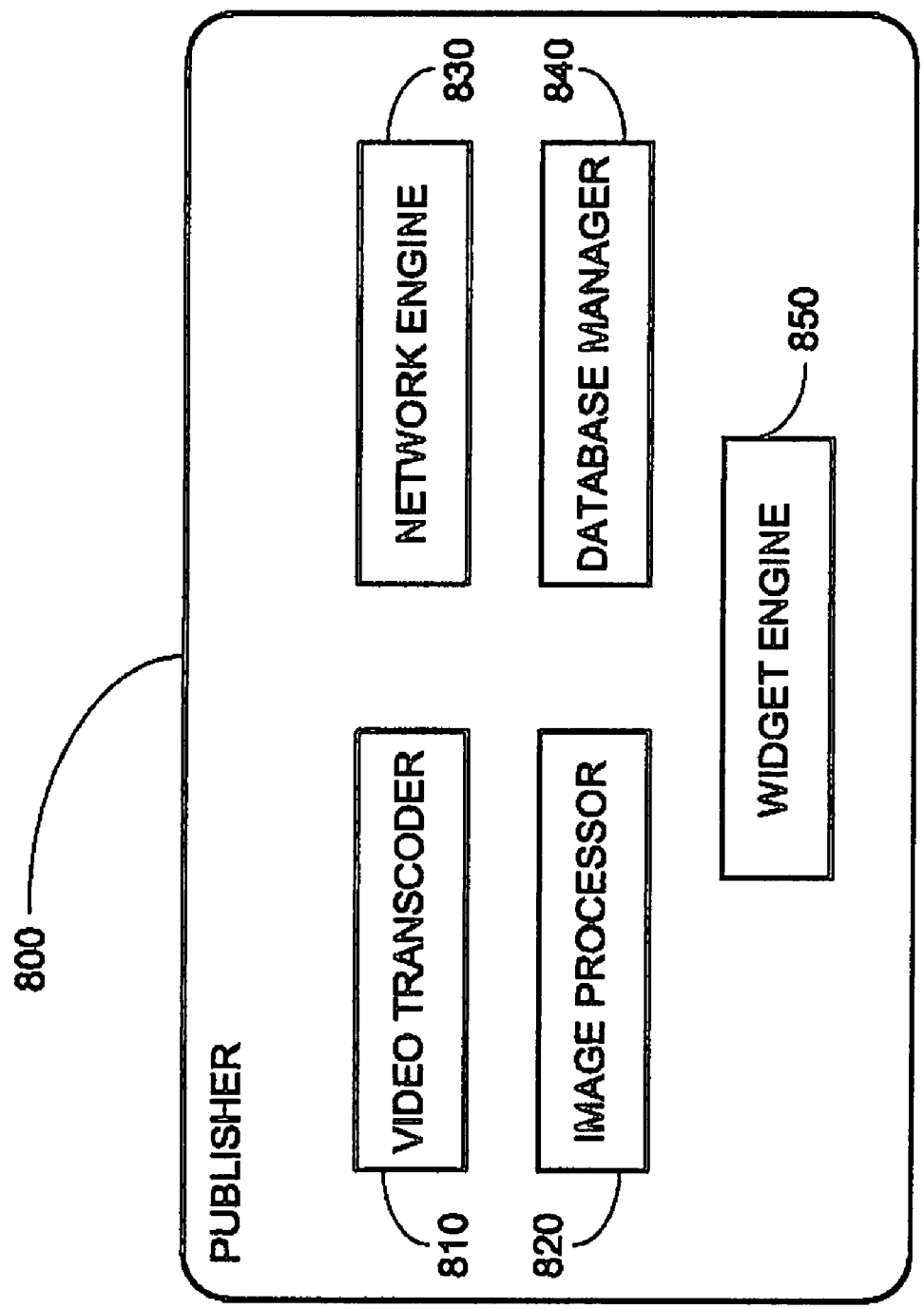
FIG. 8 is a simplified block diagram of a publisher system, for publishing media within the peer-to-broadcast system of FIG. 1, in accordance with an embodiment of the subject invention.

Reference is now made to FIG. 8, which is a simplified block diagram of a publisher system 800, for publishing media within the peer-to-broadcast system of FIG. 1, in accordance with an embodiment of the subject invention.

System 800 generally resides on publisher computers 622 and 628 (FIG. 6), although in an alternate embodiment system 800 may reside within web application 670. As shown in FIG. 8, publisher system 800 includes a video transcoder 810, for generating bit-rate targeted data streams, an image processor 820, a network engine 830, a database manager 840, and a widget engine 850. These components are described in detail hereinbelow.

In accordance with an embodiment of the subject invention, components 810-850 are accessed via an application programming interface (API). One such API is a Representational State Transfer (REST) interface. Information about REST is available on the Internet at http://en.wikipedia.org/wiki/Representational_State_Transfer. It will be appreciated by those skilled in the art that other APIs may also be used to interface components 810-850.

Video Transcoder 810

Video transcoder 810 includes a transcoder that generates bit-rate targeted data streams in one or more formats, including inter alia Microsoft Advanced Streaming Format (WMV), Macromedia Flash VP6 (FLV) and DivX Networks v5.x (AVI). Video transcoder 810 transcodes any source video which can be viewed on the publisher's computer, from a source format to a target format. Since the target format is generally chosen to be a format with ubiquitous implementations on all viewing platforms, viewers can play the video without the need to download additional decoders on their computers. Thus a typical viewer, using a web browser, is able to view video for which he has no local decoder.

Further, and in conjunction with database manager 840, the transcoding engine is able to generate multiple forms of an original source video stream; e.g., multiple bit-rate target forms of the video can be produced and stored as individual files on the local file system, with the quality (size and bit-rate targets) and other parameters being stored in the database. This allows the viewing component to request and select an appropriate bit-rate target. It also allows the system to create 'clips' from source video; e.g., the original source may an hour long video at high definition but, following processing by video transcoder 810, can exist (i) as a short three minute sample clip at a quality and resolution suitable for delivery to a mobile phone, and (ii) as a full length, but lower quality and resolution version, suitable for delivery to a web browser across the Internet.

Video transcoder 810 generally operates within an environment where multiple simultaneous and asynchronous requests may occur; e.g., requests from image processor 820 for still image representations of a video stream. As such, video transcoder 810 relies on the "command queue" mechanism and dynamic thread pool mechanism provided by widget engine 850, which is used across all components to sequence and manage the processing of asynchronous demands that are typical in a network environment where multiple viewers may be connected to a single broadcaster.

Image Processor 820

Image processor 820 includes graphic effects such as alpha channels for transparency, gradients and shadows. Image processor 820 also includes decoders for conventional image formats, including the recently established RAW camera format.

Image processor 820 interacts with video transcoder 810, whereby video transcoder 810 can be requested to seek to and render one or more still image frames from a video stream. These still frames can then be further manipulated by image processor 820; e.g., to provide small size thumbnail representations of the video. In addition, multiple frames extracted from relative time offsets in the video can be assembled into a multi-frame preview image, similar to a "contact sheet" view of the video. These thumbnails and multi-frame views can be used as user interface elements to present video content in static image formats, allowing a viewer to select which video he wants to view. Image processor 820 also cooperates with database manager 840. Similar to the multiple representations of a video stream described hereinabove, image processor 820 can produce multiple representations of a still image, in varying degrees of size and quality, where the representations are stored in a file pool on the disk and are tracked via database manager 840.

Image processor 820 generally operates within an environment where multiple simultaneous and asynchronous requests, such as requests to image processor 820 for still thumbnail representations of multiple files in a channel, are possible. As such, image processor 820 relies on the "command queue" mechanism and dynamic thread pool mechanism provided by widget engine 850, which is used across all components to sequence and manage the processing of asynchronous demands typical in a network environment where multiple viewers may be connected to a single broadcaster.

Network Engine 830

Network engine 830 includes messaging engines for client-to-client and client-to-server connections. Network engine 830 provides bi-directional communication for sending and responding to messages from broadcaster client engines to a server, and from the server to the broadcaster client engines.

It will be appreciated by those skilled in the art that in a network where (i) there are multiple viewing clients, each of whom may be viewing different channels and/or requesting different video streams from a single publisher, and (ii) at the same time the publisher may be actively updating the contents of his broadcast, coupled with the fact that some operations are more time consuming than others, the goal of achieving a perception that the publisher is performing those multiple operations in a non-blocking way (i.e., both viewer A and viewer B can request the contents of different channels at exactly the same moment in time and neither should perceive that they are waiting for the other's operation to complete) requires a mechanism that efficiently queues incoming network requests and, at the same time, fits those queued requests into other activities which may materially affect the result of those requests. Network engine 830 relies on specific technologies provided by widget engine 850 that provide multiple simultaneous connections for inbound and outbound messages, while placing them in a context where the result of one inbound message may affect the result of the next message.

As an example, a broadcaster may be updating a channel with new content, while multiple viewers are actively browsing the contents of different channels, including the one being updated. The broadcaster's activities affect the database as new content is added, as well as invoke video transcoder 810 and image processor 820 when thumbnails and bit-rate targeted streams are generated in preparation for subsequent broadcast. Requests from viewers for channel content must be responded to, which may require processing by database manager 840, transcoder 810 and image processor 820. Multiple viewers will establish multiple asynchronous connections with network engine 830, and data (e.g., textual content like channel information and meta-data, or video streams) will be streamed by network engine 830 to requesting viewers. Moreover, those viewers requesting information about the newly created channel must get up to date information, which means that network engine 830 must cooperate with database manager 840, transcoder 810 and image processor 820 command request queue managers. Thus, while there may be multiple simultaneous connections held open on a particular publisher, each of those connections may result in one or more commands being queued to the database, transcoder or imaging command queues.

Database Manager 840

Database manager 840 includes an implementation of SQL. Database manager 840 also includes a command generator and sequencer. Database manager 840 is the core of the data management system for the publisher client. The database manages several key tables, including inter alia channel tables, files-in-channel tables and cache tables. In general, all persistent data for a publisher is stored in the database, and the database also exists in a context where there are multiple layers of volatile and non-volatile caching.

Database manager 840 satisfies two requirements of the overall system design; namely, (i) that requests and events throughout the publisher ecosystem are effectively simultaneous and asynchronous, and (ii) that requests must at times be handled in strict sequence. For example, a broadcaster may be updating a channel at the same time the channel content is being viewed by multiple viewers. The broadcaster's activities change the database, including inter alia the channels table and the files-in-channel table. At the same time, a viewer's activities may cause requests for thumbnails in the channel, in turn invoking image processor 820 for content not yet decoded, which in turn results in a request for a video frame transcode, which in turn results in a database update for the newly produced thumbnail-all of which must be correctly sequenced, yet fit into a framework where a second viewer's request for the same thumbnails will deliver them from the cache and/or database layers, where the in-memory cache itself is unpredictably volatile.

In order to accomplish this degree of simultaneous transaction handling in an on-demand/just-in-time environment, database manager 840 relies on the "command queue" mechanism and dynamic thread pool mechanism provided by widget engine 850, which is used across all components to sequence and manage the processing of asynchronous demands typical in a network environment where multiple viewers may be connected to a single broadcaster, causing multiple and simultaneous asynchronous read/write commands to the database. Each write, for example, may be a multiple-faceted operation, as when a channel is updated with new files, causing several tables to be updated, while still allowing multiple reads to be simultaneously in progress. This requires multiple threads, and command queues to manage those threads in order to achieve dynamic responsiveness required of the database in an environment subject to multiple simultaneous transaction requests. Conventional native transaction handling found in database implementations is insufficient for this.

Widget Engine 850

Widget engine 850 supports widget layers such as vectors, strings and maps. Widget engine 850 also includes MAPI support. Optionally, widget engine 850 may also include support for third party widgets. Widget engine 850 includes two components—(i) a dynamic thread pool management sub-system, and (ii) generic command queue processors.

In accordance with an embodiment of the subject invention, multiple thread pool managers are created. Threads are pooled so that they can be re-used without the processor overhead that typically results from thread setup and tear down. However, in order to avoid proliferation of too many threads, which also results in processor overhead, each pool has a preset upper limit of running threads. A request for a thread to perform an operation will either be allocated to a dormant thread from the pool or, if all of the threads in the pool are currently active, be queued for later processing when one of the currently active threads is released. Threads are also subject to time-based automatic destruction. Specifically, threads which have been dormant for a preset length of time will exit, releasing system resources used by the thread.

Thread pools are used in the creation of command processing queues. A command queue is a series of generic commands which are executed in sequence under control of a thread, which in turn is managed by a thread pool manager. In order to enable multiple simultaneous event handling across multiple components which may need each other as resources, command queues are used to sequence "transactions" for all contexts, while still allowing multiple non-blocking event handling to exist across components.

For example, a request for a thumbnail representation of a video frame may be the result of an inbound message from network engine 830. Network engine 830 has multiple threads from a managed thread pool available for handling inbound message requests. If one of those requests is for a video stream, network engine 830 will queue a request command for the stream location to database manager 840, and the thread for that command will be blocked until the database command processing queue processes that command.

At the same time network engine 830 may receive a request for a thumbnail, and will queue a "get thumbnail" command to the imaging processor queue. Another thread from another pool manages the sequential execution of requests to image processor 820. This second thread will also be blocked, waiting for the thumbnail to be returned. In the meantime, the database command queue will receive execution priority, retrieve the file location of the requested video stream, and the command will complete. The network thread for that connection will then unblock and start streaming the requested video. The image processor queue may then receive execution priority, and the thumbnail request command will execute. As a result of this execution, the video transcoder thread may be activated, and once it returns an extracted thumbnail, image processor 820 will queue a "store" command, for the database command thread to store the thumbnail; but since the thumbnail will be returned from in-memory cache, image processor 820 can immediately return the requested thumbnail without first waiting for the database command to complete. However, a subsequent request for the same thumbnail from the database will of necessity be queued behind the first "store" command. When the thread managing the database command queue executes, it will do so in the queued order, and thus the "store" and "retrieve" commands will be executed in the correct sequence, while still allowing the initial request to be satisfied immediately without waiting for the database queue.

The command queuing architecture described hereinabove is dictated by the fact that there are potentially many hundreds of requests that may be being processed for a single web page view, such as a page full of thumbnails, where some of the thumbnails are cached, some are in the database, and some have not even been decoded yet. Additionally, the same page of thumbnails may be requested by many other viewers at the same time. It is essential that image decodes, video transcodes and database accesses, which are processor intensive operations, do not get repeated over and over. Without the above command queuing process across multiple threads, there are cases where the same decode could be requested over and over and, in a worst case, multiple threads activated directly from network engine 830 to get the same thumbnail, when in fact it only need be decoded once and placed into the database and/or cache once.

The combination of multiple managed threads, each responsible for command sequencing queues for multiple components, is important to the success of the overall architecture in an asynchronous and on-demand environment which must deal with unpredictable and un-sequenced requests from an essentially unbounded and unpredictable viewer base. All components of system 100 exist within a cooperative on-demand framework. A goal of the command queuing architecture approach is to provide a processing workflow that is "as little as possible, as late as possible, as few times as possible". Intensive processing, such as extracting a thumbnail from a video stream, or scaling a representation of a still image, is postponed until such time as it is necessary. Having undertaken the processing, the result is stored in multiple levels of volatile and non-volatile cache.

For example, an image may be added to a channel but has not yet been viewed in any context. When a viewer subsequently requests the contents of the channel, which can be minutes, days or weeks later, the system first checks to see if the image thumbnails for the content are in a volatile cache; typically, a bounded in-memory cache. If the images are in the memory cache, they are delivered from there directly. If the images are not in the memory cache, the framework determines if the images are in the database. If the images are in the database, the images are delivered from the database and placed in the in-memory cache. If the images are in neither the cache nor the database, image processor 820 is invoked and the thumbnails are decoded. Following decode, the thumbnail images are placed into the database and into the in-memory cache. Subsequent requests for the images, possibly from other viewers at a later time, are delivered directly from the in-memory cache. Should the memory version be purged, the next delivery is from the database, at the same time placing it into the in-memory cache.

The above general workflow applies to video thumbnail extraction, to database inquiries, and to other such operations. There are multiple levels of cache involved in many common operations that are processor intensive. Database manager 840, image processor 820 and network engine 830 are subject to multiple simultaneous requests from both local publisher and remote server and viewer activities. The same "command queue" mechanism, with support from the dynamic thread pool mechanism in widget engine 850, is used across all of these components to sequence and manage the processing of asynchronous demands typical in a network environment.

Portal Integration

Figure 9A:
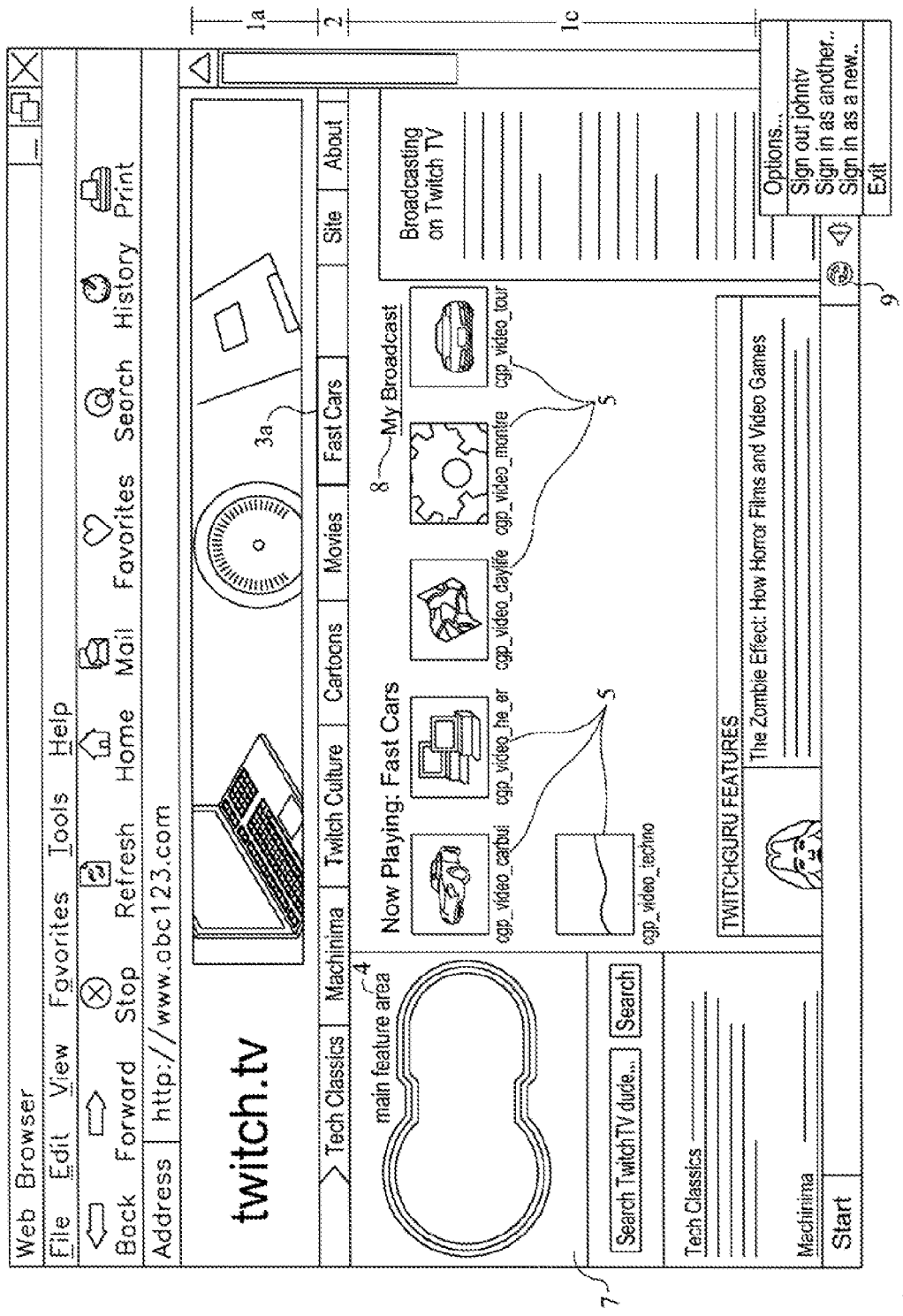
FIGS. 9A-9E shows a sample portal web page including an embedded portion broadcast from a publisher, in accordance with an embodiment of the subject invention.

In reading the above description, persons skilled in the art will realize that there are many apparent variations that can be applied to the methods and systems described. An important such variation is the ability for a publisher to broadcast his media to a web portal. Reference is now made to FIGS. 9A-9E, which show a sample portal web page including an embedded portion broadcast from a publisher, in accordance with an embodiment of the subject invention. The portal site in FIG. 9A is a foreign site; i.e., a site that is not hosted within domains of broadcasting system 100 (FIG. 1). In general, the portal site in FIG. 9A belongs to a third party. The style of the portal page, including inter alia headers and banners, designated by numeral 1a, comes from a portal owner's URL, designated by numeral 1b. The bulk of the content in the portal page, designated by numeral 1c, also comes from the portal owner's URL 1b.

The portal page illustrated in FIG. 9A contains mixed elements, such as the navigation element designated by numeral 2, which contains both portal-specific entities "Site" and "About", and entities from broadcasting system 100 including channel buttons "Tech Classics", "Machinima", "Twitch Culture", "Cartoons", "Movies" and "Fast Cars", designated by numeral 3.

The portal page includes an inline frame (iFrame) sourced from broadcasting system 100, designated by numeral 4. Area 4 is owned by broadcasting system 100, which provides content in area 4. The content provided by broadcasting system 100 is dynamically updated. An iFrame is an HTML construct that enables external objects to be included, such as an external HTML page. The source

<IFRAME> SRC=URI </IFRAME> is used to embed content from a specified universal resource identifier (URI) into a web page. iFrames can act as targets for other links.

Shown in FIG. 9A are thumbnails, designated by numeral 5, that represent content sourced from system 100 by peer publishers on the edge of a network. Area 4 is dynamically generated whenever the portal page is constructed by system 100, which has access to the group of publishers who are authorized to broadcast into the portal. System 100 determines which publisher content to include, and assembles the visible set of content for the specific channel, among the channels 3, that is chosen. Determination of which publisher content to include by system 100 may be random, or based on most recent or most popular, or such other criteria.

The portal page also includes a search control element, designated by numeral 7, which communicates with system 100. As such, the portal owner does not have to provide search engine support; instead, the search is performed by system 100 and the results delivered into iFrame 4. When a viewer selects a channel, such as the "Fast Cars" channel 3, a view of the selected channel is displayed in iFrame 4.

Figure 9B:
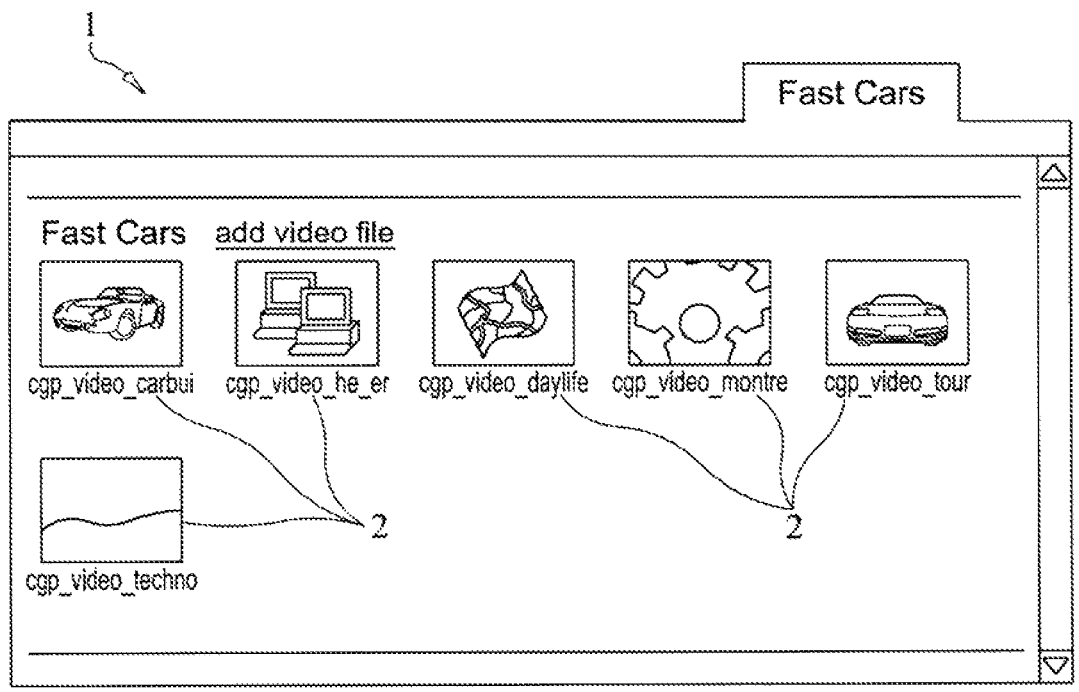

In accordance with an embodiment of the subject invention, a publisher is able to broadcast his own content directly into the portal. Specifically, a "My Broadcast" control, designated by numeral 8, enables the publisher to add content into the portal. The content that the publisher adds appears as if it is coming from the portal, whereas in fact it is coming from the publisher's computer. Shown in FIG. 9B is a publisher's view of his own broadcast channel content, displaying media files designated by numeral 2, which the publisher has added to his channel.

Figure 9C:
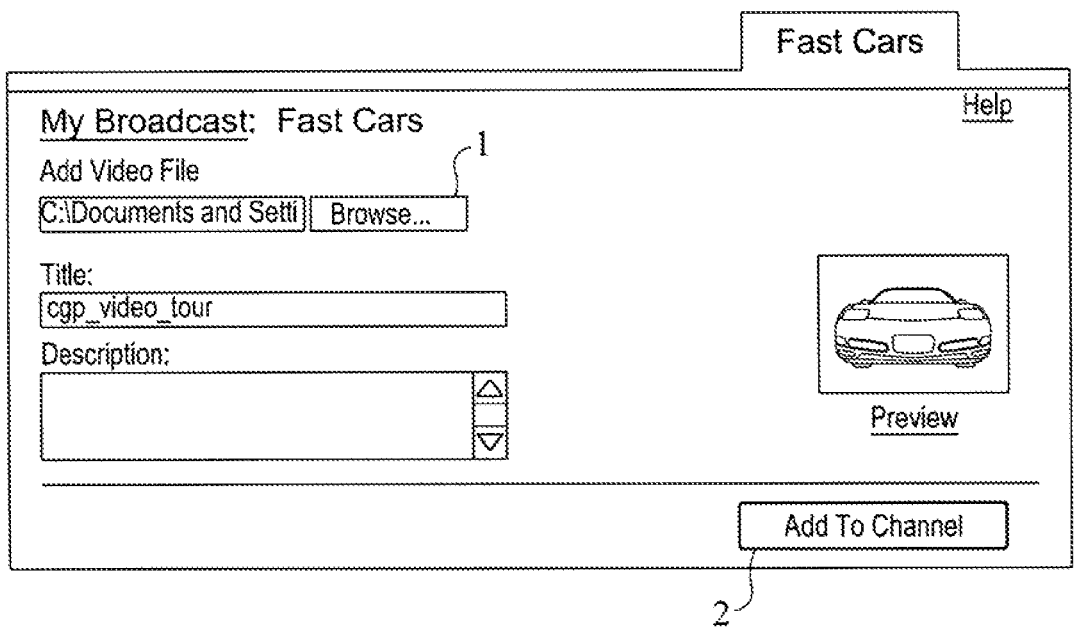

Shown in FIG. 9C is a user interface for the publisher to select media content, designated by numeral 1, to add to his channel. In accordance with an embodiment of the subject invention, the in-page iFrame communicates with the publisher computer, which decodes the publisher's media and presents a preview thumbnail. Having selected a media file and added relevant meta-data, such as a title and a description, the publisher makes his content available to the entire portal audience by pushing an "Add to Channel" button, designated by numeral 2. This event is communicated to the publisher computer, which transcodes the publisher's media into a bit-rate targeted form, stores meta-data, and communicates with system 100 that the publisher's media is ready for broadcast into the portal.

Figure 9D:
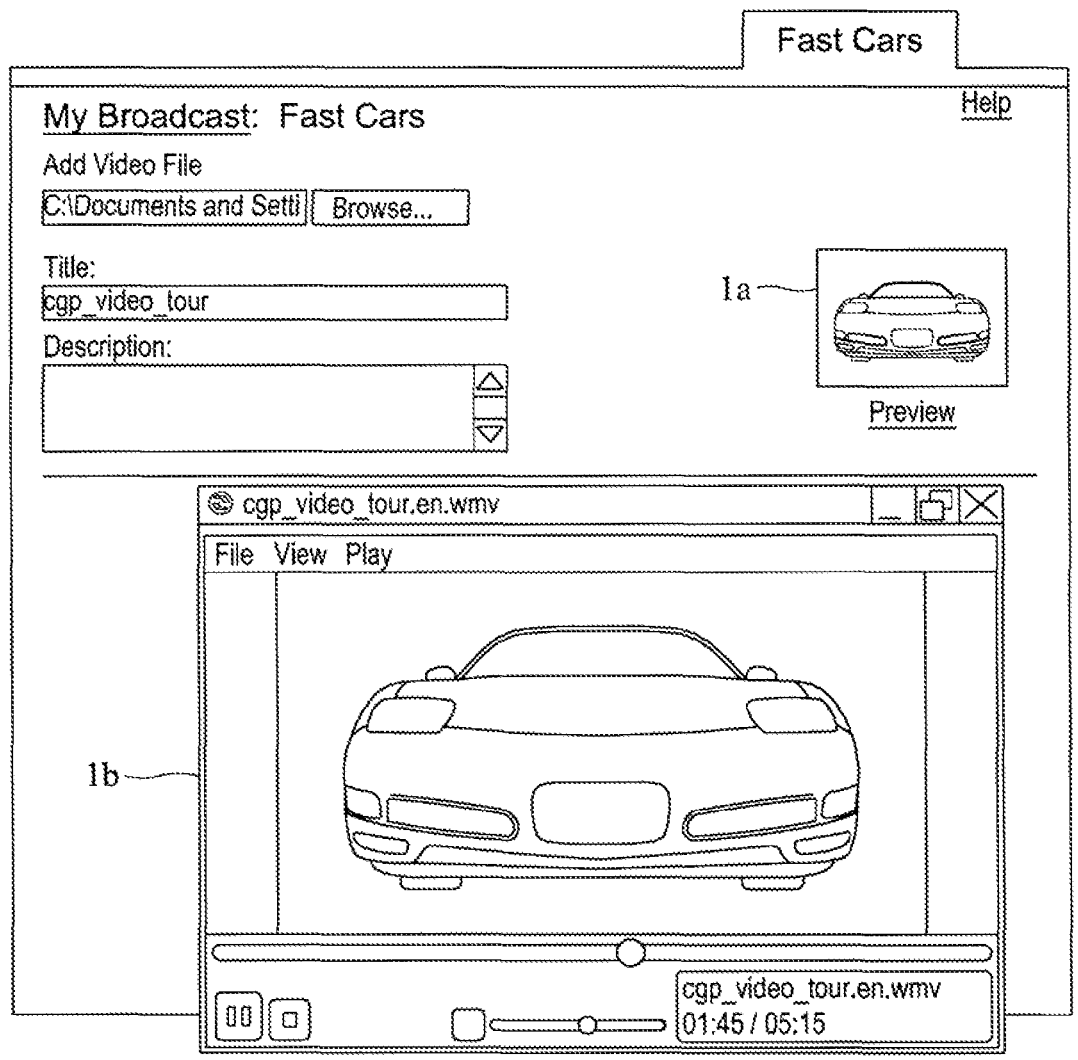
Figure 9E:
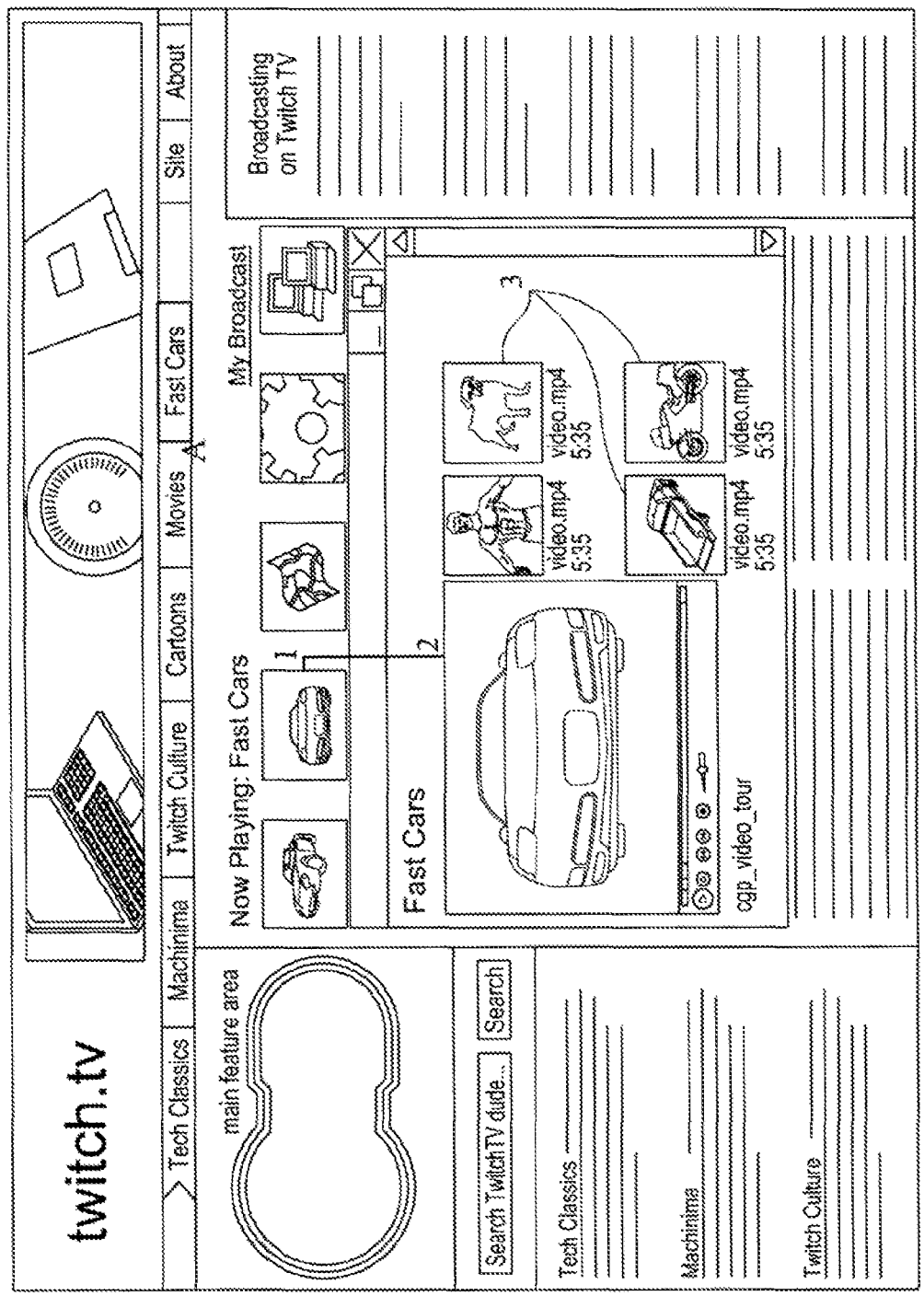

Shown in FIG. 9D is a user interface for the publisher to preview his local content. The publisher clicks on a "Preview" button, designated by numeral 1a, and the publisher computer then generates a preview window, designated by numeral 1b, and plays the publisher's media into the preview window. After adding the publisher's content into the portal, the publisher's transcoded media file is available directly to viewers from the portal page, as shown in FIG. 9E and designated by A. The set of media, designated by numeral 1, is dynamically updated to reflect the publisher's newly added content. Viewers can play the newly added media files. The video being played in FIG. 9E, designated by numeral 2, appears to be integrated into the portal, but in fact it is actually being sourced from system 100 and not from the portal's web site. Similarly, other publishers' content, designated by numeral 3, also appears as part of the channel, and can be viewed and played.

Figure 10:
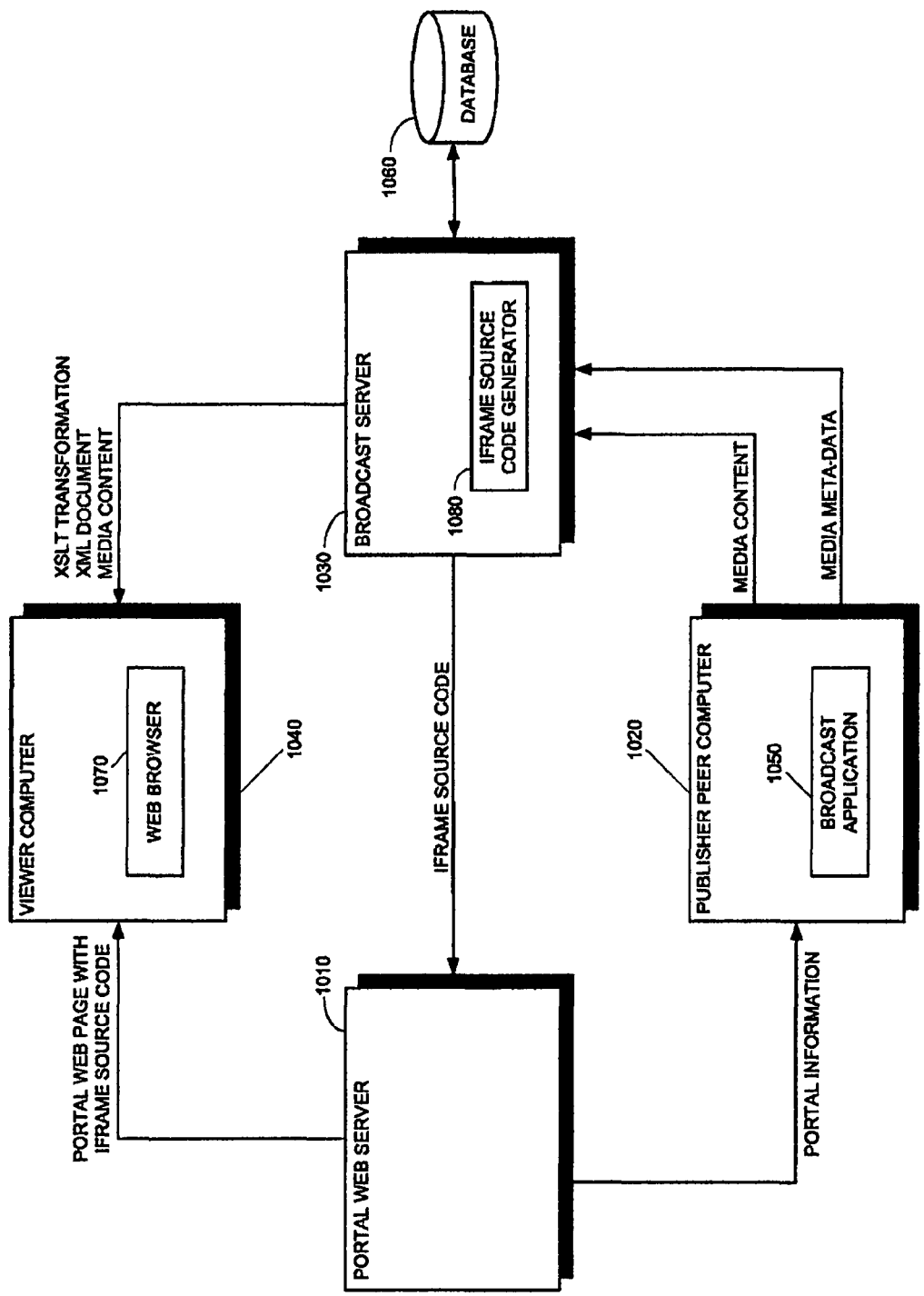
FIG. 10 is a simplified diagram of a peer-to-portal broadcasting system, in accordance with an embodiment of the subject invention.

Reference is now made to FIG. 10, which is a simplified diagram of a peer-to-portal broadcasting system, in accordance with an embodiment of the subject invention. FIG. 10 includes four components; namely, a portal web server 1010 that serves web pages to a third party portal, a publisher peer computer 1020 that is operated by one or more individuals who wish to publish media to the portal, a broadcast server 1030 that feeds broadcast content into the portal, and a viewer computer 1040 that is operated by a user browsing the web portal. It will be appreciated by those skilled in the art that viewer computer 1040 and publisher computer 1020 may be the same computer, when the publisher is browsing the portal. Whereas FIG. 1 addresses the three components publisher peer computer, broadcast server and web client peer computer, FIG. 10 has the additional portal web server 1010. Whereas in FIG. 1 the web client views the publisher's media content while browsing a web page on the broadcast server, in FIG. 10 the web client is browsing a web page on the third party web portal server. In both figures the publisher computer is proxied through the broadcast server.

The main web page for the web portal, stored on portal web server 1010, includes an iFrame with an embedded SRC that points to broadcast server 1030. Generally, while viewing a portal web page, a publisher initiates a broadcast to the portal by clicking on a control, such as the "My Broadcast" link shown in FIG. 9A. In turn a broadcast application 1050, residing on publisher computer 1020, receives the portal IP address and enables the publisher to select media files to broadcast. Broadcast application 1050 sends meta-data about the selected media files to broadcast server 1030, and broadcast server stores the meta-data in a database 1060, for later access.

Viewer computer 1040 includes a web browser 1070, through which a user browses the Internet, and in particular, the web portal. When web browser 1070 navigates to the web portal URL, it requests the main portal page from portal server 1010.

In order to serve the portal web page, portal server 1010 requests the SRC for the iFrame from broadcast server 1030. Broadcast server 1030 includes an iFrame source code generator 1080, which dynamically generates iFrame source code for the SRC, in response to the request from portal server 1010. Broadcast server 1030 sends the iFrame source code thus generated to portal server 1010. Portal server 1010 embeds the iFrame source code within the portal web page, and sends the updated portal web page with the embedded iFrame source code to web browser 1070.

The iFrame source code includes JavaScript, which web browser 1070 executes when it renders the portal web page. The JavaScript requests an XML document from broadcast server 1030. Upon receipt of the request, broadcast server 1030 retrieves the appropriate meta-data from database 1060 and dynamically generates an XML data container document on-the-fly. Broadcast server 1030 then sends the generated XML document to web browser 1070.

After receiving the XML document, web browser 1070 continues executing the JavaScript, which loads an XSLT transformation and applies the transformation to the XML document. The result of the XSLT transformation on the XML document is an HTML snippet that is embedded into the iFrame following completion of the transformation. The HTML snippet includes code to support clickable thumbnail images that reference endpoints, represented by proxy endpoints, for the publisher's broadcast media on publisher computer 1020.

After web browser 1070 renders the HTML snippet, a viewer of the portal can then click on a thumbnail image, and the portal launches a media player for playing the media associated with the thumbnail image, as shown in FIG. 9E. The media content itself is streamed from publisher computer 1020, via broadcast server 1030 acting as a proxy.

It will be appreciated by those skilled in the art that the functions of broadcast server 1030 may be distributed among a plurality of broadcast servers. In particular, a first group of broadcast servers may be dedicated to serving the iFrame source code, the XML documents and the XSLT transforms; and a second group of broadcast servers may be dedicated as a proxy to stream media from publisher computer 1020. The second group of broadcast servers corresponds to servers 632, 635, 638, 642, 645 and 648 in FIG. 6.

Figure 11:
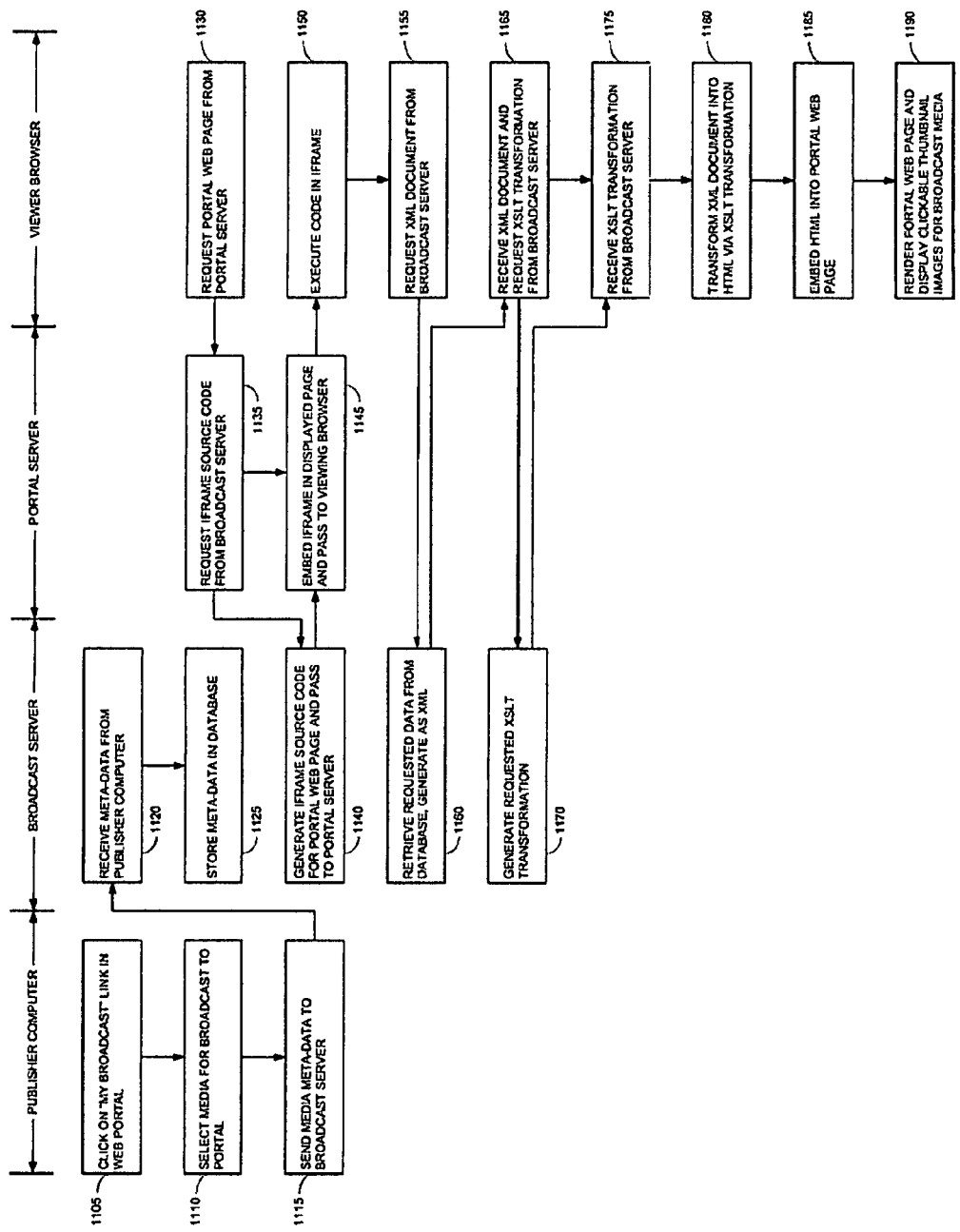
FIG. 11 is a simplified flowchart of a method for peer-to-portal broadcasting, in accordance with an embodiment of the subject invention.

Reference is now made to FIG. 11, which is a simplified flowchart of a method for peer-to-portal broadcasting, in accordance with an embodiment of the subject invention. FIG. 11 is divided into four columns, corresponding to the four components of FIG. 10. The leftmost column includes steps performed by publisher peer computer 1020. The second-from-leftmost column includes steps performed by broadcast server 1030, the second-from-rightmost column includes steps performed by portal web server 1010, and the rightmost column includes steps performed by viewer web browser 1070.

At step 1105 the publisher computer initiates preparation of a broadcast by clicking on a control within a portal web page, such as the "My Broadcast" link shown in FIG. 9A. The portal web page includes an iFrame with a SRC that points to the broadcast server. At step 1110 the publisher computer prompts the publisher to select specific media files for broadcast to the portal. At step 1115 the publisher computer sends meta-data about the selected media files to the broadcast server.

At step 1120 the broadcast server receives the meta-data from the publisher computer. At step 1125 the broadcast server stores this meta-data in a database, for later retrieval when required, at step 1160, to generate an XML container document for the meta-data.

At step 1130, the web browser navigates to the portal URL and requests the portal web page from the portal server. In response, at step 1135 the portal server requests the iFrame source code from the broadcast server. At step 1140 the portal server receives the iFrame source code from the broadcast server. At step 1145 the portal server embeds the iFrame source code in the portal page and passes it to the viewer web browser.

At step 1150 the viewer web browser, in rendering the portal web page, encounters the code in the iFrame, and executes the code. At step 1155 the code executing in the web browser requests an XML document from the broadcast server. At step 1160 the broadcast server retrieves the meta-data that was stored in the database previously at step 1125, and generates an XML data-container document therefrom. At step 1165 the viewer web browser receives the XML document from the broadcast server, and requests an XSLT transformation, to transform the XML data-container into an HTML document.

At step 1170 the broadcast server generates the XSLT transformation, which it sends to the viewer browser. At step 1175 the viewer browser receives the XSLT transformation from the broadcast server. At step 1180 the viewer browser transforms the XML document according to the XSLT transformation. The result of the transformation is a portion of HTML, referred to as a "snippet". At step 1185 the viewer browser embeds the HTML snippet into the iFrame following completion of the transformation. The viewer browser then renders the portal web page at step 1190, which now includes clickable thumbnail images that activate a media player to view streamed broadcast media, which originates at the publisher computer.

Implementation Details

Provided below are five portions of detailed sample source code, with line numbering for reference, for generating the portal web page shown in FIG. 9A, in accordance with an embodiment of the present invention. The five source code portions are as follows:

SOURCE CODE I: HTML SOURCE FOR MAIN PORTAL WEB PAGE
SOURCE CODE II: HTML SOURCE FOR IFRAME (element 4 in FIG. 9A)
SOURCE CODE III: XML DOCUMENT RETURNED FOR A MEDIA ITEM
SOURCE CODE IV: XSLT FOR TRANSFORMING THE XML INTO HTML
SOURCE CODE V: HTML OUTPUT FROM TRANSFORM The five portions of source code step through the various phases of dynamic HTML generation, for broadcast from a publisher peer computer into a foreign web portal as illustrated in FIG. 9A.

Referring to SOURCE CODE I, the portal main page includes many kinds of elements, as desired by the portal owners. Lines 98-106 define an iFrame named "pixpo", corresponding to area 4 in FIG. 9A. This iFrame area is set aside by the portal owner, and includes code necessary to instantiate a network container used by broadcast server 1030. The iFrame references the URL
http://partners.pixpo.com/group/twitchtv/container/
view?container=techclassics&pxLocation=

---

SOURCE CODE I: MAIN PORTAL PAGE

```
1   <!DOCTYPE HTML PUBLIC "-//W3C//DTD HTML 4.01 Transitional//EN">
2   <html>
3   <head>
4     <title>Tom's Guide : Tom's Hardware</title>
5     <link rel="stylesheet" type="text/css" href="inc/style.css">
6     <script>var pgml = 0;</script>
7   </head>
8   <body>
9   <div id="banner">
10    <div class="logo"><img src="img/logo_01.gif" width="165" height="45"
11  border="0" alt="TwitchTV"></div>
```

SOURCE CODE I: MAIN PORTAL PAGE

```
12    <div class="topAd"><img
13    src="http://www.kanoa.net/tgpub/img/728x90_07.jpg" width="728" height="90"
14    border="0" alt="Banner"></div>
15      <div id="topNav"><table cellspacing="0"><tr>
16    <td><a
17    href="http://partners.pixpo.com/group/twitchtv/container/view?container=techclassics"
18    target="pixpo" class="uno">Tech Classics</a></td>
19    <td><a
20    href="http://partners.pixpo.com/group/twitchtv/container/view?container=machinima"
21    target="pixpo" class="uno">Machinima</a></td>
22    <td><a
23    href="http://partners.pixpo.com/group/twitchtv/container/view?container=twitchculture"
24    target="pixpo" class="uno">Twitch Culture</a></td>
25    <td><a
26    href="http://partners.pixpo.com/group/twitchtv/container/view?container=cartoons"
27    target="pixpo" class="uno">Cartoons</a></td>
28    <td><a
29    href="http://partners.pixpo.com/group/twitchtv/container/view?container=movies"
30    target="pixpo" class="uno">Movies</a></td>
31    <td><a
32    href="http://partners.pixpo.com/group/twitchtv/container/view?container=fastcars"
33    target="pixpo" class="uno">Fast Cars</a></td>
34    <td width="80"> </td><a href="#" class="grey">SITE</a></td><td><a
35    href="#" class="grey">ABOUT</a></td><td
36    width="10"> </td></tr></table><div class="aero"></div></div>
37    </div>
38    <div id="left">
39      <img src="img/feature.jpg" width="260" height="195" border="0"
40    alt="Feature">
41      <div class="teal">
42        <table cellspacing="0" height="60">
43          <form
44    action="http://partners.pixpo.com/group/twitchtv/search/results"
45    method="get" target="pixpo">
46          <tr><td width="9"></td>
47            <td><input type="text" class="search" name="query"
48    value="Search TwitchTV dude..."></td>
49            <td width="5"></td>
50            <td><input type="image" src="img/btn_search.gif" value="Search"
51    name="Search" title"Search" alt="Search" width="60" height="25"
52    border="0"></td>
53          </tr>
54          </form>
55        </table>
56      <div class="divvy"></div>
57      <div class="padit">
58    <p><a
59    href="http://partners.pixpo.com/group/twitchtv/container/view?container=techclassics"
60    target="pixpo" class="uno">Tech Classics</a> Video interviews,
61    news reports and reviews from TwitchGuru, Tom's Hardware Guide, TG Daily
62    and other TG sites.</p>
63    <br><br>
64    <p><a
65    href="http://partners.pixpo.com/group/twitchtv/container/view?container=machinima"
66    target="pixpo" class="uno">Machinima</a> Computer-generated imagery
67    (CGI), and 3D animation video, fan-created and customized movies based on
68    popular video games.</p>
69    <br><br>
70    <p><a
71    href="http://partners.pixpo.com/group/twitchtv/container/view?container=twitchculture"
72    target="pixpo" class="uno">Twitch Culture</a> Random user-
73    generated video that focuses on the Twitch generation and its technology,
74    games, movies, music, comics, and entertainment.</p>
75    <br><br>
76    <p><a
77    href="http://partners.pixpo.com/group/twitchtv/container/view?container=cartoons"
78    target="pixpo" class="uno">Cartoons</a> The latest and most popular
79    clips of vintage anime and cartoons from television, feature films and the
80    Web.</p>
81    <br><br>
82    <p><a
83    href="http://partners.pixpo.com/group/twitchtv/container/view?container=movies"
84    target="pixpo" class="uno">Movies</a> Clips, previews and trailers of
85    the latest and most popular feature films and television shows, as well as
86    short films, spoofs, and customized re-edits.</p>
87    <br><br>
88    <p><a
89    href="http://partners.pixpo.com/group/twitchtv/container/view?container=fastcars"
```

| SOURCE CODE I: MAIN PORTAL PAGE |
|---|

```
 90  target="pixpo" class="uno">Fast Cars</a> The latest hot rods,
 91  gorgeous vintage automobiles, innovative concept cars, collectors items and
 92  eye-catching add-ons and accessories.</p>
 93      </div>
 94    </div>
 95  </div>
 96  <div id="middle">
 97    <div class="padit">
 98  <iframe id="pixpo" name="pixpo"
 99  src="http://partners.pixpo.com/group/twitchtv/container/view?container=tech
100  classics&pxLocation="
101    width="540" height="280"
102    marginwidth="0" marginheight="0"
103    hspace="0" vspace="0"
104    frameborder="0"
105    style="background-color: #000;">
106  </iframe>
107      <table cellspacing="0"<
108      <tr><td colspan="3"<
109        <div class="channel">
110          <div class="pur">TWITCHGURU FEATURES</div>
111          <table cellspacing="0"<
112            <tr><td width="140" valign="top" align="left"><a
113  href="http://twitchguru.com/2006/10/17/the_zombie_effect/"><img
114  src="http://images.tomshardware.com/_teaser/160x200/grindhouse.jpg"
115  width="140" border="0" alt="" class="bord"></a></td>
116            <td width="6"></td>
117            <td width="396" valign="top"><a
118  href="http://twitchguru.com/2006/10/17/the_zombie_effect/"><em>The Zombie
119  Effect: How Horror Films and Video Games Have Bled
120  Together</em></a><br>Horror video games have become an increasingly popular
121  genre in recent years, thanks to the influence of many classic zombie and
122  slasher flicks. TwitchGuru explores the connection between horror games
123  and horror movies.
124  <br><br>
125  <a href="http://twitchguru.com/2006/10/13/the_fall_games_preview/"><em>The
126  Fall Games Preview, Part 1</em></a><br>The fall season has arrived, and
127  with it comes a lengthy list of new games for current consoles, PCs and
128  next generation hardware. Here's a look at nine top titles for the month of
129  October.
130  <br><br>
131  <a href="http://twitchguru.com/2006/08/30/cgi_gone_awry/"><em>CGI Gone
132  Awry: The Worst Special Effects of the Computer-Generated Era</em></a><br>
133  Computer-generated imagery (CGI) has been used in film for nearly two
134  decades, but a string of poor films and cheesy effects has made CGI a four-
135  letter word for many. Here's a look at the worst offenders.</td>
136              </tr>
137            </table>
138          </div>
139        </td>
140      </tr>
141      <tr><td colspan="3">
142        <table cellspacing="0" width="100%">
143          <tr><td width="270" valign="top">
144            <div class="channel">
145              <div class="red">IMAGE GALLERY</div>
146              <table cellspacing="0">
147                <td width="6"></td>
148                <td width="264" valign="top"><a
149  href="http://twitchguru.com/2006/09/19/image_preview_september_14/index.htm
150  1"><em>Battlefield: Bad Company and Too Human </em></a><br><img
151  src="http://images. tomshardware.com/_teaser/60x60/bfbc_01.jpg" width="60"
152  height="60" align="right" hspace="6">The Battlefield series is coming to
153  next-generation consoles with a single player twinge and "90 percent
154  destructible" maps. And Too Human marks the arrival of yet another
155  exclusive Xbox 360 title. Let's take a look.</td>
156              </tr>
157            </table>
158          </div>
159        </td>
160        <td width="2"></td>
161        <td width="270" valign="top">
162          <div class="channel">
163            <div class="red">IMAGE GALLERY</div>
164            <table cellspacing="0">
165              <td width="6"></td>
166              <td width="264" valign="top"><a
167  href="http://twitchguru.com/2006/08/10/image_preview_august_09/index.html">
```

SOURCE CODE I: MAIN PORTAL PAGE

```
168  <em>White Gold: War in Paradise and Call of Duty 3 </em></a><br><img
169  src="http://images.tomshardware.com/_teaser/60x60/cod3-1.jpg" width="60"
170  height="60" align="right" hspace="6">The future, near enough to be as we
171  know it? Military struggle? Caribbean islands and graphics not unlike Far
172  Cry? Hot damn, we have an FPS! Germans? Rangers? Rain? Mud? Hot damn, we
173  have a Call of Duty sequel!</td>
174                      </tr>
175                    </table>
176                  </div>
177                </td>
178              </tr>
179            </table>
180              <div class="channel">
181              <div class="pur">TODAYS NEWS</div>
182              <table cellspacing="0">
183                <tr><td width="268" valign="top"><a
184  href="http://www.tgdaily.com/2006/10/19/apple_iphone_rumor/"
185  target="_top"><em>Apple files for iPhone trademark-rumor</a></em> <br>
186  <br>
187  <em><a
188  href="http://www.tgdaily.com/2006/10/19/cellphone_shipments_q3_2006/"
189  target="_top"><em>Mobile phone shipments keep growing on a fast
190  pace</a></em> <br> <br>
191  <em><a href="http://www.tgdaily.com/2006/10/19/sony_battery_recall/"
192  target="_top"><em>Battery recall estimated to cost Sony at least $430
193  million</a></em> <br> <br>
194  <em><a href="http://www.tgdaily.com/2006/10/18/sun_virtualization/"
195  target="_top"><em>Sun wants to be different in virtualization
196  market</a></em><br><br>
197  </td>
198                  <td width="6"></td>
199                  <td width="268" valign="top">
200  <a href="http://www.tgdaily.com/2006/10/19/china_internet_rumors_outlawed/"
201  target="_top"><em>Internet rumors outlawed in China </a></em> <br> <br>
202  <em><a href="http://www.tgdaily.com/2006/10/19/100gb_xbox_drive/"
203  target="_top"><em>100 GB Xbox 360 hard drive on the way?</a></em> <br>
204  <br>
205  <em><a href="http://www.tgdaily.com/2006/10/19/nvidia_nvperfkit_21/"
206  target="_top"><em>Nvidia offers performance boosting debugging kit for
207  Linux and Windows</a></em> <br> <br>
208  <em><a href="http://www.tgdaily.com/2006/10/19/invisible_cloak/"
209  target="_top"><em>Scientists create 'invisibility' cloak that bends
210  microwaves</a></em><br><br>
211  </td>
212                </tr>
213              </table> </div>
214            </div>
215          </td>
216        </table>
217        </div>
218  </div>
219  <div id="right">
220      <div class="teal"><div class="padit"><center><b><font
221  color="#FF9900">Broadcasting <br>on Twitch TV</font></b> </center><br>
222  Twitch TV is an eclectic collection of what's hot right now in the Twitch
223  world and we want you in the mix.<br><br>
224  To participate in this free flowing video love-in, just download the PIXPO
225  Broadcast Engine for Twitch TV Within minutes you can add your own video
226  to the Twitch TV mix-streaming right from your desktop. <br><br>
227  The PIXPO Broadcast Engine for Twitch TV is a quick 3mb PC download that
228  you can install in less time than it takes to read this page. <br><br>
229  Once installed and running, you'll find an easy "My Broadcast" link right
230  here within the Twitch TV page that gives you access to broadcast your
231  videos right into Twitch TV.<br><br>
232  Once your computer is turned off your videos will not be available on
233  Twitch TV until your computer is turned back on.<br><br>
234  Download the PIXPO Broadcast Engine for Twitch TV and join the party.
235  </div>
236  </div>
237  </div>
238  <div>
239  </body>
240  </html>
```

Referring to SOURCE CODE II, the iFrame includes dynamically generated content; i.e., iFrame source code generator 1070 on broadcast server 1030 generates SOURCE CODE II. In turn, the generated SOURCE CODE II contains calls to JavaScript in order to transform XML documents that are sourced from broadcast server 1030.

Lines 241-252 define a framework for the iFrame. Lines 253 and 254 reference style sheets that allow the iFrame to have the look and feel of the framing portal. Lines 255-257 reference style sheets provided by the portal owners, and sourced from the owners' servers. Lines 258, 259 and 278-283 correspond to the bridge code described hereinabove with reference to FIG. 4, that allows 127.0.0.1 to be mapped to localhost.mixpo.com. Line 285 corresponds to channel specific generated code.

Lines 289-297 define a "My Broadcast" control that initiates an application for publishing media to the portal.

Lines 334-358 form a block of dynamically generated code to manage media elements in a channel. For each media item in the iFrame, one such block of code is dynamically generated. Within this block of code, lines 336 and 337 generate executable code, which contains calls to an interface that returns an XML document. The XML document returned from the interface is listed in SOURCE CODE III hereinbelow. The XML document contains meta-data and endpoints related to the actual live publisher's content. At lines 352-354 the XML document is transformed (this.transform( )) to HTML that contains the source code for placing clickable thumbnails onto the portal page, and the HTML is inserted dynamically (box.insertBefore( )) into the portal web page. The XSLT transformation, used to transform the XML document to HTML, is listed in SOURCE CODE IV hereinbelow. The HTML output from the transformation, which is inserted into the portal page, is listed in SOURCE CODE V hereinbelow.

Blocks 359-383 and 384-408 are similar to the block at lines 337-362, and are repeated for all items in the iFrame.

SOURCE CODE II: IFRAME SOURCE

```
241  <!DOCTYPE html PUBLIC "-//W3C//DTD XHTML 1.0 Transitional//EN"
242  "http://www.w3.org/TR/xhtml1/DTD/xhtml1-transitional.dtd">
243  <html xmlns="http://www.w3.org/1999/xhtml" lang="en-CA" xml:lang="en-CA">
244  <head>
245  <base href="http://partners.pixpo.com/group/twitchtv/container/" />
246  <meta http-equiv="Content-Type" content="text/html; utf-8" />
247  <meta name="description" content="Video sharing is quick and easy with
248  PiXPO. Free video share tool. Create your own video website in minutes." />
249  <meta name="keywords" content="video sharing, video share, free video
250  sharing, share videos, share, website, community, websites, videos, pixpo"
251  />
252  <title>Portal Experience</title>
253  <link href="/css/site.css" rel="stylesheet" type="text/css" />
254  <link href="/css/main.css" rel="stylesheet" type="text/css" />
255  <link href="container.css" rel="stylesheet" type="text/css" />
256  <link href="http://images.tomshardware.com/Design/style/twitchtv.css"
257  rel="stylesheet" type="text/css" />
258      <script type="text/javascript"
259  src="http://127.0.0.1:5278/api/client/localhost" charset="utf-8"></script>
260      <script type="text/javascript" src="/js/site.js" charset="utf-8">
261  </script>
262      <script type="text/javascript" src="/js/core.js" charset="utf-8">
263  </script>
264      <!--[if IE]>
265          <script type="text/javascript" src="/js/ie-compatibility.js"
266  charset="utf-8"></script>
267      <![endif]-->
268  </head>
269  <body class="main">
270  <noscript>
271      <p>Javascript is required.</p>
272  </noscript>
273  <div id="PxLoading">Loading...</div>
274  <div id="page">
275      <script type="text/javascript">
276      document.getElementById('page').style.display = 'block';
277      </script>
278      <iframe class="bridge"
279  src="http://localhost.pixpo.com:5278/srv/bridge.html"></iframe>
280      <iframe class="bridge"
281  src="http://liveweb.pixpo.com/static_assets/bridge2.html"></iframe>
282      <iframe class="bridge"
283  src="http://partners.pixpo.com/bridge.html"></iframe>
284      <div id="header" class="contain">
285  <h1 id="recent">Now Playing: <span id="fastcars" class="containerName">Fast
286  Cars</span></h1>
287  <a id="broadcastToday" href="/group/twitchtv/becomebroadcaster">Broadcast
288  Your Video Here</a>
289  <script type="text/javascript">
290  var myBroadcast = getEl('broadcastToday');
291  if(localHost.user != null)
292      {
293      myBroadcast.id = 'myBroadcast';
294      myBroadcast.href = '/group/twitchtv/mybroadcast/index';
295      myBroadcast.firstChild.nodeValue = 'My Broadcast';
296      }
```

| SOURCE CODE II: IFRAME SOURCE |
|---|

```
297    </script>
298      </div>
299      <div id="pageBody" class="contain">
300  <div id="mediaWrap">
301      <div id="media" class="contain">
302        <script type="text/javascript">
303        var transform = new Transform(psb, '/xslt/video.xslt');
304        var totalItems = 10;
305        var collectionSize = 6;
306        var requestedItems = 0;
307        var loadedItems = 0;
308        var page = 0;
309        var ugcTimer = new WaitTimer( );
310        ugcTimer.show = function( )
311        {
312          getE1('placeholder').style.display = 'block';
313          this.pane = notifications.request.loading('placeholder');
314        }
315        ugcTimer.hide = function( )
316        {
317          getE1('placeholder').style.display = 'none';
318        }
319        function DoneLoading( )
320        {
321          requestedItems++;
322          ugcTimer.clear( );
323          if(requestedItems == collectionSize && loadedItems == 0)
324          {
325            if(page == 0)
326              getE1('media').appendChild(createE1('p', null, 'Sorry but
327  there are no videos to view.'));
328            else
329              getE1('media').appendChild(createE1('p', null, 'Sorry but
330  there are no more videos to view.'));
331          }
332        }
333        </script>
334        <script type="text/javascript">
335        ugcTimer.mark( );
336        var item = new Request(lwb, '/api/media/f49b07c6-1852-4621-bbd9-
337  f345cae6d241');
338        item.setContainer('media');
339        item.user = 'johntv';
340        item.xslt = transform;
341        item.onwait = function( ){ };
342        item.onerror = function( ){DoneLoading( );};
343        item.onclientoffline = function( ){DoneLoading( );};
344        item.onsuccess = function( )
345        {
346          loadedItems++;
347          DoneLoading( );
348          if(loadedItems <= totalItems)
349          {
350            var box = getE1('media');
351            var div = createE1('div', {className:'item'});
352            box.insertBefore(div, getE1('placeholder'));
353            this.transform('ugc', div, {user:'johntv',
354  container:'fastcars', page:page});
355          }
356        }
357        item.send( );
358        </script>
359        <script type="text/javascript">
360        ugcTimer.mark( );
361        var item = new Request(lwb, '/api/media/bdf6c944-a58e-4dc5-828c-
362  0786c96e9a57');
363        item.setContainer('media');
364        item.user = 'johntv';
365        item.xslt = transform;
366        item.onwait = function( ){ }
367        item.onerror = function( ) {DoneLoading( );};
368        item.onclientoffline = function( ) {DoneLoading( );};
369        item.onsuccess = function( )
370        {
371          loadedItems++;
372          DoneLoading( );
373          if(loadedItems <= totalItems)
374          {
```

SOURCE CODE II: IFRAME SOURCE

```
375              var box = getE1('media');
376              var div = createE1('div', {className:'item'});
377              box.insertBefore(div, getE1('placeholder'));
378                  this.transform('ugc', div, {user:'johntv',
379    container:'fastcars', page:page});
380              }
381          }
382          item.send( );
383          </script>
384          <script type="text/javascript">
385          ugcTimer.mark( );
386          var item = new Request(lwb, '/api/media/bcc90e13-d9ae-475a-b5c6-
387    2e13d153ebb6');
388          item.setContainer('media');
389          item.user = 'johntv';
390          item.xslt = transform;
391          item.onwait = function( ){ };
392          item.onerror = function( ){DoneLoading( );};
393          item.onclientoffline = function( ){DoneLoading( );};
394          item.onsuccess = function( )
395              {
396              loadedItems++;
397              DoneLoading( );
398              if(loadedItems <= totalItems)
399                  {
400                  var box = getE1('media');
401                  var div = createE1('div', {className:'item'});
402                  box.insertBefore(div, getE1('placeholder'));
403                      this.transform('ugc', div, {user:'johntv',
404    container:'fastcars', page:page});
405                  }
406              }
407          item.send( );
408          </script>
409      </div>
410    </div>
411    <div id="footer">
412    <p id="poweredPiXPO">Powered by <a href="http://www.pixpo.com/"
413    target="_blank">PiXPO</a></p>
414    </div>
415    </body>
416    </html>
```

Referring to SOURCE CODE III, the XML document returned by the request at lines 336 and 337 is listed.

SOURCE CODE III: XML DOCUMENT FOR MEDIA ITEM

```
417    <?xml version="1.0" encoding="UTF-8"?>
418    <ItemRecord type="video">
419    <ID>51e2312b-ab79-491e-ba3d-634f0ea4402</ID>
420    <FileName>e32006_army_wmv_512kbps.wmv</FileName>
421    <Title>USArmy</Title>
422    <Description></Description>
423    <Tags></Tags>
424    <VideoDescriptor>
425    <Width>320</Width>
426    <Height>240</Height>
427    <BitRate>573Kbps</BitRate>
428    <Duration>00:03:33.679</Duration>
429    <Format>WMV</Format>
430    <MSVideoTranscodeStatus code="complete">
431    <TranscodeCompleteDescriptor>
432    <Width>320</Width>
433    <Height>240</Height>
434    <BitRate>294Kbps</BitRate>
435    <Duration>00:03:33.701</Duration>
436    <TranscodeProfile>
       ENCODERPROFILE_300KBPS_320PX_FULL</TranscodeProfile>
437    </TranscodeCompleteDescriptor>
438    </MSVideoTranscodeStatus>
439    </VideoDescriptor>
440    </ItemRecord>
```

Referring to SOURCE CODE IV, the XSLT used to transform the XML to HTML, when invoked at lines 353 and 354, is listed. SOURCE CODE IV includes multiple transforms. The transforms for the publisher content are provided in lines 473-475 and 629-643. "UGC" below stands for user generated content. Lines 502-508 show the insertion of clickable thumbnail images for playing video content.

SOURCE CODE IV: TRANSFORM FROM XML TO HTML VIA XSLT

```
441    <?xml version="1.0" encoding="utf-8"?>
442    <xsl:stylesheet xmlns:xsl="http://www.w3.org/1999/XSL/Transform"
443    version="1.0">
```

| SOURCE CODE IV: TRANSFORM FROM XML TO HTML VIA XSLT |
|---|

```
444  <xsl:output method="html"/>
445  <xsl:param name="method"/>
446  <xsl:param name="host"/>
447  <xsl:param name="user"/>
448  <xsl:param name="container"/>
449  <xsl:param name="displayName"/>
450  <xsl:param name="page"/>
451  <xsl:template match="/">
452    <xsl:if test="$method = 'videoadd'">
453      <xsl:call-template name="videoadd"/>
454    </xsl:if>
455    <xsl:if test="$method = 'videoedit'">
456      <xsl:call-template name="videoedit"/>
457    </xsl:if>
458    <xsl:if test="$method = 'videoerror'">
459      <xsl:call-template name="videoerror"/>
460    </xsl:if>
461    <xsl:if test="$method = 'container'">
462      <xsl:call-template name="container"/>
463    </xsl:if>
464    <xsl:if test="$method = 'transcodefailed'">
465      <xsl:call-template name="transcodefailed"/>
466    </xsl:if>
467    <xsl:if test="$method = 'description'">
468      <xsl:call-template name="description"/>
469    </xsl:if>
470    <xsl:if test="$method = 'result'">
471      <xsl:call-template name="result"/>
472    </xsl:if>
473    <xsl:if test="$method = 'ugc'">
474      <xsl:call-template name="ugc"/>
475    </xsl:if>
476    <xsl:if test="$method = 'ugc.search'">
477      <xsl:call-template name="ugc.search"/>
478    </xsl:if>
479    <xsl:if test="$method = 'ugcPopup'">
480      <xsl:call-template name="ugcPopup"/>
481    </xsl:if>
482  </xsl:template>
483  <xsl:template name="videoadd">
484    <xsl:call-template name="video">
485      <xsl:with-param name="action" select="'video.add( )'"/>
486      <xsl:with-param name="label" select="'Add To Channel'"/>
487    </xsl:call-template>
488  </xsl:template>
489  <xsl:template name="videoedit">
490    <xsl:call-template name="video">
491      <xsl:with-param name="action" select="'video.update( )'"/>
492      <xsl:with-param name="label" select="'Update Video'"/>
493      <xsl:with-param name="remove" select="'Remove From Channel'"/>
494    </xsl:call-template>
495  </xsl:template>
496  <xsl:template name="video">
497    <xsl:param name="action"/>
498    <xsl:param name="label"/>
499    <xsl:param name="remove"/>
500    <xsl:choose>
501      <xsl:when test="ItemRecord/@type = 'video'">
502        <div id="thumbnail">
503          <img
504  src="{$host}/api/media/{ItemRecord/ID/text( )}?view=image&size=medthumb&
505  amp;cropstyle=43center"/>
506          <a href="#" onclick="Action('video.preview( )',
507  '{ItemRecord/ID/text( )}'); return false;">Preview</a>
508        </div>
509        <form id="videoInfo" action="/api/media/{ItemRecord/ID/text( )}"
510  method="post" onsubmit="Action('{$action}', this); return false;">
511          <div>
512            <div class="element">
513              <label for="title">Title: </label><input id="title"
514  type="text" name="title" value="{ItemRecord/Title/text( )}" maxlength="70"/>
515            </div>
516            <div class="element">
517              <label for="description">Description: </label><textarea
518  id="description" name="description"><xsl:value-of select=
519  "ItemRecord/Description/text( )"/></textarea>
520            </div>
521            <div class="nav contain">
```

SOURCE CODE IV: TRANSFORM FROM XML TO HTML VIA XSLT

```
522            <input type="hidden" name="container"
523 value="{$container}"/>
524            <input type="hidden" name="resId"
525 value="{ItemRecord/ID/text( )}"/>
526            <input type="submit" name="update" value="{$label}"/>
527            <xsl:if test="$remove">
528              <input type="button" name="remove" value="{$remove}"
529 onclick="Action('video.remove( )', this.form);"/>
530            </xsl:if>
531          </div>
532        </div>
533      </form>
534    </xsl:when>
535    <xsl:otherwise>
536      <p>Sorry but at this time only video files are supported.</p>
537    </xsl:otherwise>
538  </xsl:choose>
539 </xsl:template>
540 <xsl:template name="videoerror">
541   <xsl:if test="ErrorResult/Error/@code = 'notFound'">
542     <p>The file you have selected could not be found by PiXPO on your
543 filesystem.</p>
544   </xsl:if>
545   <xsl:if test="ErrorResult/Error/@code = 'typeNotSupported'">
546     <p>The file you have selected could is of a type not supported by
547 PiXPO.</p>
548   </xsl:if>
549   <xsl:if test="ErrorResult/Error/@code = 'decodeFailure'">
550     <p>The file you have selected could not be decoded by PiXPO.</p>
551   </xsl:if>
552   <xsl:if test="ErrorResult/Error/@code = 'error'">
553     <p>A fatal error occurred with PiXPO.</p>
554   </xsl:if>
555 </xsl:template>
556 <xsl:template name="container">
557   <xsl:choose>
558     <xsl:when test="Items/@total = 0">
559       <p>You are currently <strong>not</strong> broadcasting any videos
560 into this channel. You should <strong><a
561 href="add?container={$container}&displayName={$displayName}">add</a></
    strong>
562 some videos now.</p>
563     </xsl:when>
564     <xsl:otherwise>
565       <xsl:for-each select="Items/ItemRecord">
566         <div class="item">
567           <xsl:choose>
568             <xsl:when
569 test="VideoDescriptor/MSVideoTranscodeStatus[@code = 'error']">
570               <a
571 href="transcodefailed?videoGuid={ID/text( )}&container={$container}&
572 displayName={$displayName}" title="Remove this failed video file">
573                 <img src="/images/error-thumbnail.gif"
574 class="thumb"/>
575                 <span class="button edit">Remove</span>
576                 <span class="title"><xsl:value-of
577 select="Title/text( )"/></span>
578               </a>
579             </xsl:when>
580             <xsl:otherwise>
581               <a
582 href="edit?videoGuid={ID/text( )}&container={$container}&displayName=
583 {$displayName}" title="Edit this video">
584                 <img
585 src="{$host}/api/media/{ID/text( )}?view=image&size=medthumb&cropstyle=
586 43center" class="thumb"/>
587                 <span class="button edit">Edit</span>
588                 <span class="title"><xsl:value-of
589 select="Title/text( )"/></span>
590               </a>
591             </xsl:otherwise>
592           </xsl:choose>
593         </div>
594       </xsl:for-each>
595     </xsl:otherwise>
596   </xsl:choose>
597 </xsl:template>
598 <xsl:template name="transcodefailed">
```

SOURCE CODE IV: TRANSFORM FROM XML TO HTML VIA XSLT

```
599    <div id="thumbnail">
600       <img
601 src="{$host}/api/media/{ItemRecord/ID/text( )}?view=image&size=medthumb&
602 amp;cropstyle=43center"/>
603       <a href="#" onclick="Action('video.preview( )',
604 '{ItemRecord/ID/text( )}'); return false;">Preview</a>
605    </div>
606    <form id="videoInfo" action="/api/media/{ItemRecord/ID/text( )}"
607 method="post" onsubmit="Action('video.remove( )', this); return false;">
608       <div>
609          <h3>Title:</h3>
610          <p><xsl:value-of select="ItemRecord/Title/text( )"/></p>
611             <h3>Description:</h3>
612          <p id="description"><xsl:value-of
613 select="ItemRecord/Description/text( )"/></p>
614             <div class="nav contain">
615             <input type="hidden" name="container" value="{$container}"/>
616             <input type="hidden" name="resId"
617 value="{ItemRecord/ID/text( )}"/>
618             <input type="submit" name="remove" value="Remove Broken File"/>
619          </div>
620       </div>
621    </form>
622 </xsl:template>
623 <xsl:template name="description">
624    <h2><xsl:value-of select="ItemRecord/Title/text( )"/></h2>
625    <p><xsl:value-of select="ItemRecord/Description/text( )"/></p>
626 </xsl:template>
627 <xsl:template name="result">
628 </xsl:template>
629 <xsl:template name="ugc">
630    <a
631 href="player?user={$user}&video={ItemRecord/ID/text( )}&container={$
632 container}&page={$page}" title="Play this video"
633 onclick="window.open(this.href, 'ugcplayer',
634 'width=630, height=430, scrollbars=yes,resizable=yes,toolbar=no,statusbar=no');
635 return false;">
636       <img
637 src="http://liveweb.pixpo.com/{$user}/api/media/{ItemRecord/ID/text( )}?view=
638 image&size=medthumb&cropstyle=43center" class="thumb"/>
639       <span class="button play">Play</span>
640       <span class="title"><xsl:value-of select="ItemRecord/Title/text( )"/>
641 </span>
642    </a>
643 </xsl:template>
644 <xsl:template name="ugc.search">
645    <a
646 href="player?user={$user}&video={ItemRecord/ID/text( )}&page={$page}"
647 title="Play this video" onclick="window.open(this.href, 'ugcplayer',
648 'width=345,height=430,scrollbars=yes,resizable=yes,toolbar=no,statusbar=no');
649 return false;">
650       <img
651 src="http://liveweb.pixpo.com/{$user}/api/media/{ItemRecord/ID/text( )}?view=
652 image&size=medthumb&cropstyle=43center" class="thumb"/>
653       <span class="button play">Play</span>
654       <span class="title"><xsl:value-of select="ItemRecord/Title/text( )"/>
655 </span>
656    </a>
657 </xsl:template>
658 <xsl:template name="ugcPopup">
659    <a href="player?user={$user}&video={ItemRecord/ID/text( )}"
660 title="Play this video" onclick="Action('video.updateMovie( )', '{$user}',
661 '{ItemRecord/ID/text( )}'); return false;">
662       <img
663 src="http://liveweb.pixpo.com/{$user}/api/media/{ItemRecord/ID/text( )}?view=
664 image&size=medthumb&cropstyle=43center" class="thumb"/>
665       <span class="button play">Play</span>
666       <span class="title"><xsl:value-of select="ItemRecord/Title/text( )"/>
667 </span>
668    </a>
669 </xsl:template>
670 </xsl:stylesheet>
```

Referring to SOURCE CODE V, the HTML output from applying the XSTL transformation in SOURCE CODE IV to the XML document in SOURCE CODE III is listed. It is noted that the HTML output corresponds to the section of code in the XSLT transformation at lines 629-643. The variable ID at line 631 is set to the media identifier 51e2312b- ab79-491e-ba3d-634f0ea4402, according to line 419 of XML document. Parameters such as $user, $container and $page at lines 447, 448 and 450, respectively, are calling parameters from lines 353 and 354.

The HTML output is inserted into the portal web page, according to line 352.

---

SOURCE CODE V: INSERT TRANSFORMED XML AS HTML INTO PAGE

```
671 <DIV class="item">
672   <A
673     href="player?user=twitchguru2&video=51e2312b-ab79-491e-ba3d-
674 0634f0ea4402&container=techclassics&page=0"
675     title="Play this video" onclick="window.open(this.herf, 'ugcplayer',
676 'width=630,height=430,scrollbars=yes,resizable=yes,toolbar=no,statusbar=no');
677 return false;">
678     <IMG
679       src="http://liveweb.pixpo.com/twitchguru2/api/media/51e2312b-ab79-
680 491e-ba3d-0634f0ea4402?view=image&size=medthumb&cropstyle=43center"
681 class="thumb"/>
682     <SPAN class="button play">
683 Play </SPAN>
684     <SPAN class="title">
685 USArmy        </SPAN>
686   </A>
687 </DIV>
```

---

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for peer-to-portal broadcasting, comprising:
   receiving, from each of one or more publishers, meta-data for media files designated by the publisher for broadcast to web browsers via a portal;
   in response to a request from the portal, dynamically generating source code, the source code comprising including instructions for causing a web browser:
     (i) to request, from a broadcast server, an XML document that includes the meta-data for one or more of the publisher media files that are selected by a user who is using the web browser to browse a web page of the portal;
     (ii) to transform the XML document to an HTML document using an XSLT transformation; and
     (iii) to insert the resulting HTML document into the web page of the portal; and
   transmitting the dynamically generated source code to the portal for further transmission, within the web page of the portal, to the web browser,
wherein the web browser is remote from the portal and remote from the one or more publishers, and wherein the broadcast server is remote from the portal and remote from the one or more publishers and remote from the web browser.

2. The method of claim 1 further comprising:
   storing the received meta-data in a database; and
   dynamically generating the XML document that includes the meta-data for the one or more of the publisher media files that are selected by the user, based on the meta-data stored in the database.

3. The method of claim 1 wherein the resulting HTML document includes source code for placing clickable thumbnail images into the portal web page, the clickable thumbnail images being linked to play the one or more of the publisher media files that are selected by the user.

4. The method of claim 3 further comprising transcoding the one or more of the publisher media files that are selected by the user for bit-rate targeted streaming.

5. The method of claim 1 further comprising providing a publisher interface for communicating with the one or more publishers, through which said receiving is facilitated.

6. The method of claim 1 further comprising controlling transmission of the publisher media files to the web browser.

7. The method of claim 6 wherein said controlling does not route the publisher media files through the portal when transmitting the publisher media files to the web browser.

8. A system for peer-to-portal broadcasting, comprising:
   a portal web server serving a portal web page that includes source code received from and generated by a broadcast server, to a web browser, in response to a request received from the web browser, wherein the source code comprises instruction that cause the web browser to transform at least one data-container document for broadcast media files, into at least one web page that assembles a plurality of web objects;
   a broadcast server, comprising:
     a source code generator for generating the source code that is included in the portal web page, in response to a request received from said portal web server; and
     a document generator for generating the at least one data-container document for broadcast media files;
   a web client computer, comprising a web browser comprising a dynamic web page generator and assembler, for requesting the portal web page from said portal web server and for executing the source code included in the portal web page; and
   a publisher computer comprising a broadcast tool that enables a publisher to broadcast media files from the publisher computer to said web client computer via said broadcast server, in response to said web client computer executing the source code included in the portal web page,
wherein said broadcast server is distinct from said portal web server and communicatively coupled with said portal web server, wherein said web client computer is distinct from said portal web server and from said broadcast server, and communicatively coupled with said portal web server and with said broadcast server, and wherein said publisher computer is distinct from said portal web server, from said broadcast server and from said web client computer, and communicatively coupled with said broadcast server.

9. The system of claim 8 wherein the plurality of web objects assembled by the at least one web page include clickable thumbnail images, the clickable thumbnail images being linked to play the publisher media files.

10. The system of claim 8 further comprising a proxy server for proxying streaming of the publisher media files from the publisher computer to the web client computer.

11. The system of claim 8 wherein said broadcast server comprises a publisher interface for communicating with said broadcast tool.

12. The system of claim 8 wherein said broadcast server controls broadcast of the publisher media files from said publisher computer to said web client computer.

13. The system of claim 12 wherein said broadcast server controls broadcast of the publisher media files such that the transmission of the media files from said publisher computer to said web client computer does not route the published media files through said portal web server.

14. A computer-readable non-transitory storage medium storing program code for causing a broadcast server:

to receive, from each of one or more publishers, meta-data for media files designated by the publisher for broadcast to web browsers via a portal;
    to dynamically generate source code, in response to a request from the portal, the source code comprising instructions for causing a web browser:
        (i) to request, from a broadcast server, an XML document that includes the meta-data for one or more of the publisher media files that are selected by a user who is using the web browser to browse a web page of the portal;
        (ii) to transform the XML document to an HTML document using an XSLT transformation; and
        (iii) to insert the resulting HTML document into the web page of the portal; and
    to transmit the dynamically generated source code to the portal for further transmission, within the web page of the portal, to the web browser, wherein the web browser is remote from the portal and remote from the one or more publishers, and wherein the broadcast server is remote from the portal and remote from the one or more publishers and remote from the web browser.

\* \* \* \* \*